US012453529B2

(12) United States Patent
Nishihara

(10) Patent No.: US 12,453,529 B2
(45) Date of Patent: Oct. 28, 2025

(54) ULTRASOUND DIAGNOSIS APPARATUS, MEDICAL IMAGE PROCESSING APPARATUS, AND NON-TRANSITORY COMPUTER-READABLE STORAGE MEDIUM STORING THEREIN MEDICAL IMAGE PROCESSING PROGRAM

(71) Applicant: CANON MEDICAL SYSTEMS CORPORATION, Otawara (JP)

(72) Inventor: Kuramitsu Nishihara, Otawara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 424 days.

(21) Appl. No.: 17/806,171

(22) Filed: Jun. 9, 2022

(65) Prior Publication Data

US 2022/0405885 A1 Dec. 22, 2022

(30) Foreign Application Priority Data

Jun. 21, 2021 (JP) ................................. 2021-102163

(51) Int. Cl.
*G06T 5/00* (2024.01)
*A61B 8/00* (2006.01)
*A61B 8/08* (2006.01)
*G06T 5/50* (2006.01)

(52) U.S. Cl.
CPC ............ *A61B 8/0883* (2013.01); *A61B 8/463* (2013.01); *A61B 8/488* (2013.01); *A61B 8/5207* (2013.01); *A61B 8/5246* (2013.01); *A61B 8/5269* (2013.01); *G06T 5/50* (2013.01); *G06T 2207/10132* (2013.01); *G06T 2207/20221* (2013.01)

(58) Field of Classification Search
CPC ... G06T 5/00; G06T 5/50; G06T 2207/10132; G06T 2207/20221; G06T 11/00; A61B 8/5207; A61B 8/5246
See application file for complete search history.

(56) References Cited

U.S. PATENT DOCUMENTS

| 2014/0064591 | A1* | 3/2014 | Sasaki .................. A61B 8/5207 382/131 |
| 2019/0209133 | A1* | 7/2019 | Takahashi ............ A61B 8/5207 |
| 2019/0350533 | A1* | 11/2019 | Takeda ..................... A61B 8/54 |
| 2021/0077060 | A1* | 3/2021 | Kim ..................... A61B 8/5269 |

FOREIGN PATENT DOCUMENTS

JP 2019-118715 A 7/2019

* cited by examiner

*Primary Examiner* — Ayodeji O Ayotunde
(74) *Attorney, Agent, or Firm* — Oblon, McClelland, Maier &Neustadt, L.L.P.

(57) ABSTRACT

An ultrasound diagnosis apparatus according to an embodiment includes processing circuitry and a display. The processing circuitry generates, from ultrasound data, pieces of low and high frequency data corresponding to resolutions of gradual degrees, extracts pieces of negative high frequency data over a range of predetermined resolutions, from the pieces of high frequency data, restores the resolution of first addition data so as to be equal to the resolution of the ultrasound data before reduction, the first addition data being obtained by adding up the pieces of negative high frequency data while causing resolutions to match over the range of the predetermined resolutions, and generates a combined image on the basis of the restored first addition data and the ultrasound data. The display displays the combined image.

11 Claims, 17 Drawing Sheets

ULTRASOUND DIAGNOSIS APPARATUS, MEDICAL IMAGE PROCESSING APPARATUS, AND NON-TRANSITORY COMPUTER-READABLE STORAGE MEDIUM STORING THEREIN MEDICAL IMAGE PROCESSING PROGRAM

CROSS-REFERENCE TO RELATED APPLICATIONS

This application is based upon and claims the benefit of priority from Japanese Patent Application No. 2021-102163, filed on Jun. 21, 2021; the entire contents of which are incorporated herein by reference.

FIELD

Embodiments described herein relate generally to an ultrasound diagnosis apparatus, a medical image processing apparatus, and a non-transitory computer-readable storage medium storing therein a medical image processing program.

BACKGROUND

Conventionally, ultrasound images may contain, together with biological information, artifacts such as multipath defects, sidelobes, and the like. Those artifacts may obstruct processes of diagnosing biological structures and characteristics. For this reason, there is a demand for capabilities of inhibiting the occurrence of the artifacts and inhibiting the artifacts from being displayed. Conventionally, inhibiting artifacts from being displayed is realized by manipulating dynamic ranges or changing color maps. These processes are to improve visibility of the biological information by displaying images while emphasizing the difference between signal intensities of the biological information and signal intensities of the artifacts, by utilizing the notion that, in much ultrasound data, the signal intensities of the artifacts are different from (often lower than) those of the biological information.

The conventional method for inhibiting the artifacts is realized by changing display settings. For this reason, it would be difficult to appropriately achieve the effect of inhibiting the artifacts unless the display settings are appropriately established every time, in accordance with characteristics of acquired ultrasound data. Further, depending on the characteristics of the ultrasound data, the signal intensities of the biological information may greatly overlap the signal intensities of the artifacts, which makes it difficult to improve the visibility by emphasizing the difference between the signal intensities. Examples of other methods for improving the visibility include a method by which contrast is improved with the use of a technique related to transmission aperture synthesis.

DETAILED DESCRIPTION

Figure 1:
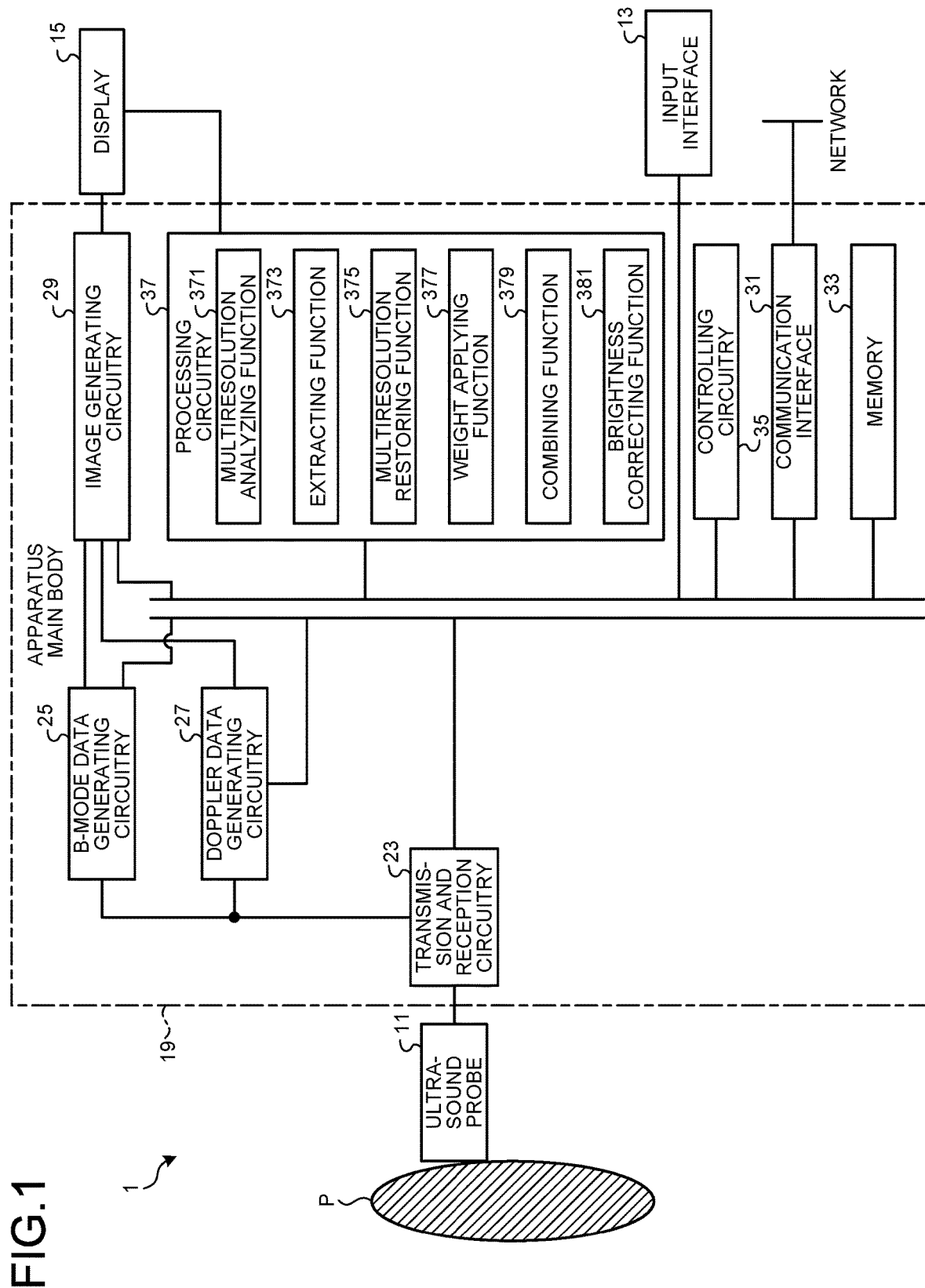
FIG. 1 is a diagram illustrating an exemplary configuration of an ultrasound diagnosis apparatus according to a first embodiment.

An ultrasound diagnosis apparatus described in the following embodiments includes processing circuitry and a display. The processing circuitry is configured to generate, from ultrasound data, a plurality of pieces of low frequency data and high frequency data corresponding to a plurality of resolutions of gradual degrees. The processing circuitry is configured to extract pieces of negative high frequency data over a range of predetermined resolutions, from the plurality of pieces of high frequency data. The processing circuitry is configured to restore the resolution of first addition data so as to be equal to the resolution of the ultrasound data before reduction, the first addition data being obtained by adding up the pieces of negative high frequency data while causing resolutions to match over the range of the predetermined resolutions. The processing circuitry is configured to generate a combined image on the basis of the restored first addition data and the ultrasound data. The display is configured to display the combined image.

In the following sections, exemplary embodiments of an ultrasound diagnosis apparatus, a medical image processing apparatus, and a medical image processing program will be explained, with reference to the accompanying drawings. To explain a specific example, a first embodiment will use an example of an ultrasound diagnosis apparatus. In the embodiments described below, some of the constituent elements referenced by using mutually the same reference characters are assumed to perform the same operation, and duplicate explanations thereof will be omitted.

First Embodiment

FIG. 1 is a diagram illustrating an exemplary configuration of an ultrasound diagnosis apparatus 1 according to the present embodiment. As illustrated in FIG. 1, the ultrasound diagnosis apparatus 1 includes an ultrasound probe 11, an input interface 13, a display 15, and an apparatus main body 19.

The ultrasound probe 11 includes a plurality of piezoelectric transducer elements, a matching layer provided on the ultrasound wave emission surface side of the piezoelectric transducer elements, a backing member provided on the rear surface side of the piezoelectric transducer elements and configured to prevent ultrasound waves from propagating rearwards from the piezoelectric transducer elements, and the like. Each of the plurality of piezoelectric transducer elements is configured to generate an ultrasound wave in response to a drive signal supplied thereto from transmission and reception circuitry 23 (explained later). The ultrasound probe 11 is a one-dimensional array probe detachably connected to an apparatus main body 7. On the basis of the drive signal supplied from ultrasound transmission circuitry 71 included in the apparatus main body 7, the plurality of piezoelectric transducer elements are configured to generate the ultrasound wave. Additionally, the ultrasound probe 11 may be provided with a button that can be pressed at the time of a freeze operation or the like.

When the ultrasound wave is transmitted from the ultrasound probe 11 to an examined subject (hereinafter, "patient") P, the transmitted ultrasound wave is repeatedly reflected on a surface of discontinuity of acoustic impedances at a tissue in the body of the patient P. The reflected ultrasound wave is received as a reflected wave signal (hereinafter, "echo signal") by the plurality of piezoelectric transducer elements included in the ultrasound probe 11. The amplitude of the received echo signal is dependent on the difference between the acoustic impedances on the surface of discontinuity on which the ultrasound wave is reflected. Further, when a transmitted ultrasound pulse is reflected on the surface of a moving blood flow, a cardiac wall, or the like, the echo signal is, due to the Doppler effect, subject to a frequency shift, depending on a velocity component of the moving members with respect to the ultrasound wave transmission direction. The ultrasound probe 11 is configured to receive the echo signal arriving from the patient P and to convert the received echo signal into an electrical signal.

The input interface 13 is configured to bring various types of commands, instructions, information, selections, and settings from an operator, into the ultrasound diagnosis apparatus 1. The input interface 13 is realized by using a trackball, a switch button, a mouse, a keyboard, a touchpad on which input operations can be performed by touching an operation surface thereof, a touch panel display device in which a display screen and a touchpad are integrally formed, and/or the like. The input interface 13 is configured to convert input operations received from the operator into electrical signals. In the present disclosure, the input interface 13 does not necessarily have to include physical operation component parts such as a mouse, a keyboard, and/or the like. For instance, possible examples of the input interface 13 include electrical signal processing circuitry configured to receive an electrical signal corresponding to an input operation from an external input device provided separately from the ultrasound diagnosis apparatus 1 and to output the received electrical signal to the apparatus main body 19. The input interface 13 corresponds to an input unit.

As the display 15, it is possible to use, for example, a Liquid Crystal Display (LCD) device, a Cathode Ray Tube (CRT) display device, an Organic Electroluminescence Display (OELD) device, a plasma display device, or any other arbitrary display device, as appropriate. Further, the display 15 may be incorporated in the apparatus main body 7. Further, it is possible to configure the display 15 as a desktop type or by using a tablet terminal or the like capable of wirelessly communicating with the apparatus main body 7. The display 15 corresponds to a display unit.

The display 15 is configured to display various types of images generated by image generating circuitry 29 (explained later) or the like. The display 15 includes display circuitry configured to realize the display of the various types of images. Further, the display 15 is configured to display a Graphical User Interface (GUI) used by the operator for inputting various types of setting requests. In an example, a plurality of displays may be connected to the apparatus main body 19 of the ultrasound diagnosis apparatus 1.

The apparatus main body 19 includes the transmission and reception circuitry (a transmission and reception unit) 23, B-mode data generating circuitry (a B-mode data generating unit) 25, Doppler data generating circuitry (a Doppler data generating unit) 27, the image generating circuitry (an image generating unit) 29, a communication interface 31, a memory (a storage unit) 33, controlling circuitry (a controlling unit) 35, and processing circuitry (a processing unit) 37.

The transmission and reception circuitry 23 includes a pulse generator, transmission delay circuitry, and pulser circuitry and is configured to supply the drive signal to each of the plurality of piezoelectric transducer elements included in the ultrasound probe 11. The pulse generator is configured to repeatedly generate a rate pulse used for forming a transmission ultrasound wave at a predetermined rate frequency fr Hz (the cycle: 1/fr seconds). The transmission delay circuitry is configured to apply a delay time period that is required to converge the transmission ultrasound wave into the form of a beam and to determine transmission directionality, to each of the rate pulses. The pulser circuitry is configured to apply a voltage pulse as the drive signal to each of the piezoelectric transducer elements in the ultrasound probe 11, with timing based on the rate pulses. An ultrasound beam is thus transmitted to the patient P.

The transmission and reception circuitry 23 further includes a pre-amplifier, an analog-to-digital (hereinafter, "A/D") converter, reception delay circuitry, and an adder. The transmission and reception circuitry 23 is configured to generate a reception signal on the basis of the reception echo signal generated by the piezoelectric transducer elements. The pre-amplifier is configured to amplify, with respect to each of the channels, the echo signal having arrived from the patient P and received via the ultrasound probe 11. The A/D converter is configured to convert the amplified reception echo signal into a digital signal. The reception delay circuitry is configured to apply a delay time period required to determine reception directionality, to the reception echo signal converted into the digital signal. The adder is configured to add up a plurality of echo signals resulting from applying the delay time period. As a result of the addition, the transmission and reception circuitry 23 is configured to generate a reception signal in which a reflection component from the direction corresponding to the reception directionality is emphasized. With the transmission directionality and the reception directionality described herein, comprehensive directionality of the ultrasound transmission and reception is determined. On the basis of the comprehensive directionality, an ultrasound beam (a so-called ultrasound scanning line) is determined.

The B-mode data generating circuitry 25 includes an envelope detector and a logarithmic converter and is configured to generate B-mode data on the basis of the reception signal. The envelope detector is configured to perform an envelope detection process on the reception signal. The logarithmic converter is configured to perform a logarithmic conversion on signals resulting from the envelope detection process and to relatively emphasize weak signals among the signals resulting from the envelope detection process. The B-mode data generating circuitry 25 is configured to generate a signal value (referred to as "B-mode data") corresponding to each of various depths on each of the scanning lines, on the basis of the signals emphasized by the logarithmic converter.

The Doppler data generating circuitry 27 includes a mixer, a Low Pass Filter (hereinafter, "LPF"), and the like and is configured to generate Doppler data on the basis of the reception signal. The mixer is configured to multiply the reception signal by a reference signal having a frequency f0 of the transmission ultrasound wave and to generate a signal having a component of a Doppler shift frequency fd and a signal having a frequency component of (2f0+fd). The LPF is configured to eliminate the signal having the higher frequency component (2f0+fd) from the signals output by the mixer. Accordingly, the Doppler data generating circuitry 27 generates Doppler data having the component of the Doppler shift frequency fd from the reception signal. In this situation, by performing a Doppler process including a frequency analysis, the Doppler data generating circuitry 27 may generate, as the Doppler data, dynamic information (e.g., data related to a color Doppler image or data related to a power Doppler image) such as velocity, dispersion, power, and the like of a blood flow.

The image generating circuitry 29 includes a Digital Scan Converter (hereinafter, "DSC"), an image memory (neither is illustrated), and the like. The DSC is configured to convert (by performing a scan convert process) a scanning line signal sequence including the B-mode data and the Doppler data from the ultrasound scan into a scanning line signal sequence in a video format. The image generating circuitry 29 is configured to generate data of an ultrasound image, by combining the B-mode data and the Doppler data resulting from the scan convert process with text information, graduations, and the like of various types of parameters. The data of the ultrasound image is display-purpose data. The ultrasound image is an example of the medical image. Further, the data of the ultrasound image is an example of medical data. In contrast, the B-mode data, volume data, and the Doppler data may be referred to as raw data. In the following sections, the ultrasound image and the raw data will collectively be referred to as ultrasound data. For example, the ultrasound data is at least one of: data related to a B-mode image, raw data related to the B-mode image, and data related to a power Doppler image. The image memory is configured to save therein a plurality of ultrasound images (hereinafter, "ultrasound video images") corresponding to a series of frames immediately before a freeze operation is input. The plurality of ultrasound images stored in the image memory are used for cine display.

The communication interface 31 is connected, via a network, to an external apparatus such as a medical image storage apparatus. The communication interface 31 is configured to transfer various types of data output from the image generating circuitry 29, the processing circuitry 37, and the like, to the external apparatus.

The memory 33 is configured by using a Hard Disk Drive (HDD), a Solid State Drive (SSD), a magnetic disk (e.g., a floppy [registered trademark] disk or a hard disk), an optical disk (e.g., a Compact Disk Read-Only Memory [CD-ROM] or a Digital Versatile Disk [DVD]), a semiconductor memory, or the like. The memory 33 is configured to store therein a program related to the ultrasound transmission and reception, a program corresponding to various types of processes performed by the controlling circuitry 35 and the processing circuitry 37, and the like. The memory 33 is configured to store therein the raw data, the ultrasound image data, various types of data generated and processed by the processing circuitry 37, and the like.

As hardware resources thereof, the controlling circuitry 35 includes a processor and a memory, for example. The controlling circuitry 35 functions as a core of the ultrasound diagnosis apparatus 1. More specifically, the controlling circuitry 35 is configured to read a control program stored in the memory 33, to load the read program into a memory, and to control various types of units in the ultrasound diagnosis apparatus 1 according to the loaded control program.

As hardware resources thereof, the processing circuitry 37 includes a processor and a memory, for example. More specifically, the processing circuitry 37 is configured to read programs stored in the memory 33, to load the read programs into a memory, and to realize various types of functions according to the loaded programs. The processing circuitry 37 includes a multiresolution analyzing function 371, an extracting function 373, a multiresolution restoring function 375, a weight applying function 377, a combining function 379, and a brightness correcting function 381. The processing circuitry 37 realizing the multiresolution analyzing function 371, the extracting function 373, the multiresolution restoring function 375, the weight applying function 377, the combining function 379, and the brightness correcting function 381 corresponds to a multiresolution analyzing unit, an extracting unit, a multiresolution restoring unit, a weight applying unit, a combining unit, and a brightness correcting unit, respectively.

For example, when the raw data (the B-mode data) of the B-mode image related to B-mode is obtained by the B-mode data generating circuitry 25, the processing circuitry 37 is configured to perform a contrast improving process employing the multiresolution analyzing function 371, the extracting function 373, the multiresolution restoring function 375, the weight applying function 377, the combining function 379, and the brightness correcting function 381. The B-mode data is a B-mode image before the B-mode image serving as a display image is generated, i.e., before the scan convert process. The contrast improving process is, for example, a process of obtaining structure information of the patient's body in the ultrasound data by performing a multiresolution analysis on the ultrasound data so that, by using a region spatially excluding the biological structure as an artifact region, signal intensities in the artifact region are suppressed. In the following sections, to explain a specific example, it is assumed that the contrast improving process uses the B-mode data (i.e., raw data) as the ultrasound data. Alternatively, the contrast improving process may use any of various types of ultrasound images after the scan convert process, as the ultrasound data.

By employing the multiresolution analyzing function 371, the processing circuitry 37 is configured to generate, from the ultrasound data, a plurality of pieces of low frequency data and a plurality of pieces of high frequency data corresponding to a plurality of resolutions of gradual degrees. The plurality of resolutions of the gradual degrees correspond to a plurality of hierarchical levels (hereinafter, simply "levels"). In the following sections, a multiresolution analysis performed by the multiresolution analyzing function 371 will be explained, with reference to FIGS. 2 and 4.

Figure 2:
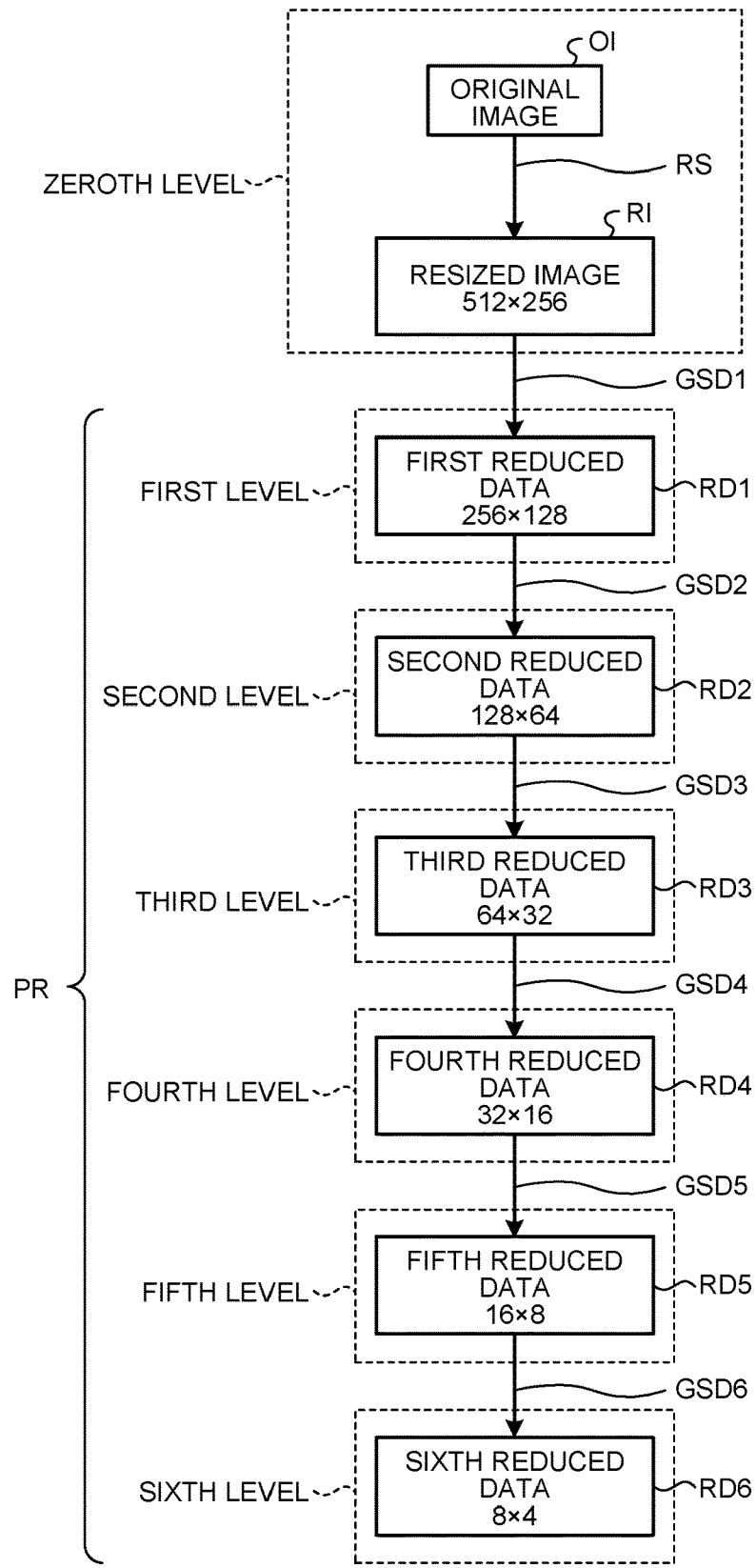
FIG. 2 is a diagram illustrating an example of a multi-resolution analysis, according to the first embodiment.

FIG. 2 is a diagram illustrating a process using a Gaussian pyramid, which is an example of a multiresolution analysis to generate low frequency data. An original image OI illustrated in FIG. 2 corresponds to the raw data of a B-mode image. For example, when the number of pixels in the height direction and the number of pixels in the width direction of the original image are each larger than a predetermined number of pixels, the multiresolution analyzing function 371 is configured to generate a resized image RI, by performing a resizing process RS on the original image CI. The number of pixels in the height direction×the number of pixels in the width direction of the resized image RI may be 512×256, for example. When the number of pixels in the height direction and the number of pixels in the width direction of the original image are each equal to the predetermined number of pixels, the resizing process RS is unnecessary.

A plurality of levels PR in FIG. 2 are six levels of a plurality of image sizes smaller than the image size of the resized image RI, i.e., six levels of mutually-different resolutions that are lower than the resolution of the original image OI. The quantity of the plurality of levels is set in advance. In an example, the quantity of the plurality of levels may be set by a user, via the input interface 13. Further, the quantity of the plurality of levels may be input by the user as appropriate, by making an adjustment or a change via the input interface 13.

The multiresolution analyzing function 371 is configured to perform a first Gaussian reduction GSD1 on the resized image RI and to thus generate first reduced data RD1 having an image size of 256×128 where the number of pixels in the height direction and the number of pixels in the width direction are each halved. In this situation, the Gaussian reduction denotes an image reduction process using a Gaussian filter. The size of the first reduced data RD1 is one-fourth of the size of the resized image RI and belongs to the first level reached by reducing the resized image RI to a lower resolution.

The multiresolution analyzing function 371 is configured to perform a second Gaussian reduction GSD2 on the first reduced data RD1 and to thus generate second reduced data RD2 having an image size of 128×64 where the number of pixels in the height direction and the number of pixels in the width direction are each halved. The size of the second reduced data RD2 is one-fourth of the size of the first reduced data RD1. The second reduced data RD2 belongs to the second level reached by reducing the first reduced data RD1 to a lower resolution.

The multiresolution analyzing function 371 is configured to perform a third Gaussian reduction GSD3 on the second reduced data RD2 and to thus generate third reduced data RD3 having an image size of 64×32 where the number of pixels in the height direction and the number of pixels in the width direction are each halved. The size of the third reduced data RD3 is one-fourth of the size of the second reduced data RD2. The third reduced data RD3 belongs to the third level reached by reducing the second reduced data RD2 to a lower resolution.

The multiresolution analyzing function 371 is configured to perform a fourth Gaussian reduction GSD4 on the third reduced data RD3 and to thus generate fourth reduced data RD4 having an image size of 32×16 where the number of pixels in the height direction and the number of pixels in the width direction are each halved. The size of the fourth reduced data RD4 is one-fourth of the size of the third reduced data RD3. The fourth reduced data RD4 belongs to the fourth level reached by reducing the third reduced data RD3 to a lower resolution.

The multiresolution analyzing function 371 is configured to perform a fifth Gaussian reduction GSD5 on the fourth reduced data RD4 and to thus generate fifth reduced data RD5 having an image size of 16×8 where the number of pixels in the height direction and the number of pixels in the width direction are each halved. The size of the fifth reduced data RD5 is one-fourth of the size of the fourth reduced data RD4. The fifth reduced data RD5 belongs to the fifth level reached by reducing the fourth reduced data RD4 to a lower resolution.

The multiresolution analyzing function 371 is configured to perform a sixth Gaussian reduction GSD6 on the fifth reduced data RD5 and to thus generate sixth reduced data RD6 having an image size of 8×4 where the number of pixels in the height direction and the number of pixels in the width direction are each halved. The size of the sixed reduced data RD6 is one-fourth of the size of the fifth reduced data RD5. The sixth reduced data RD6 belongs to the sixth level reached by reducing the fifth reduced data RD5 to a lower resolution.

Figure 3:
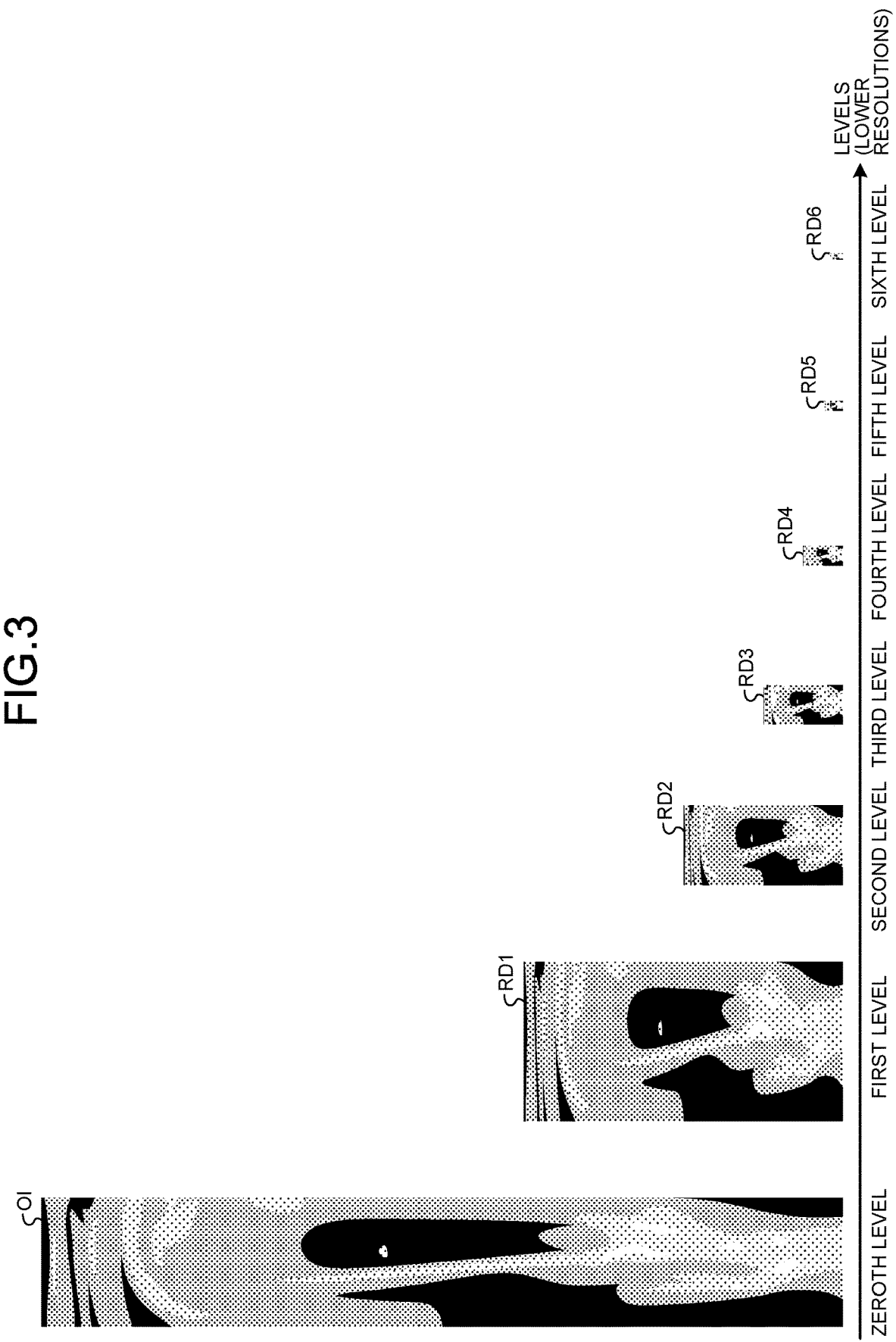
FIG. 3 is a drawing illustrating an example of various types of data corresponding to a plurality of hierarchical levels, according to the first embodiment.

FIG. 3 is a drawing illustrating examples of the original image OI, the first reduced data RD1, the second reduced data RD2, the third reduced data RD3, the fourth reduced data RD4, the fifth reduced data RD5, and the sixth reduced data RD6. As illustrated in FIG. 3, the resolutions of the pieces of reduced data become lower according to the levels.

Figure 4:
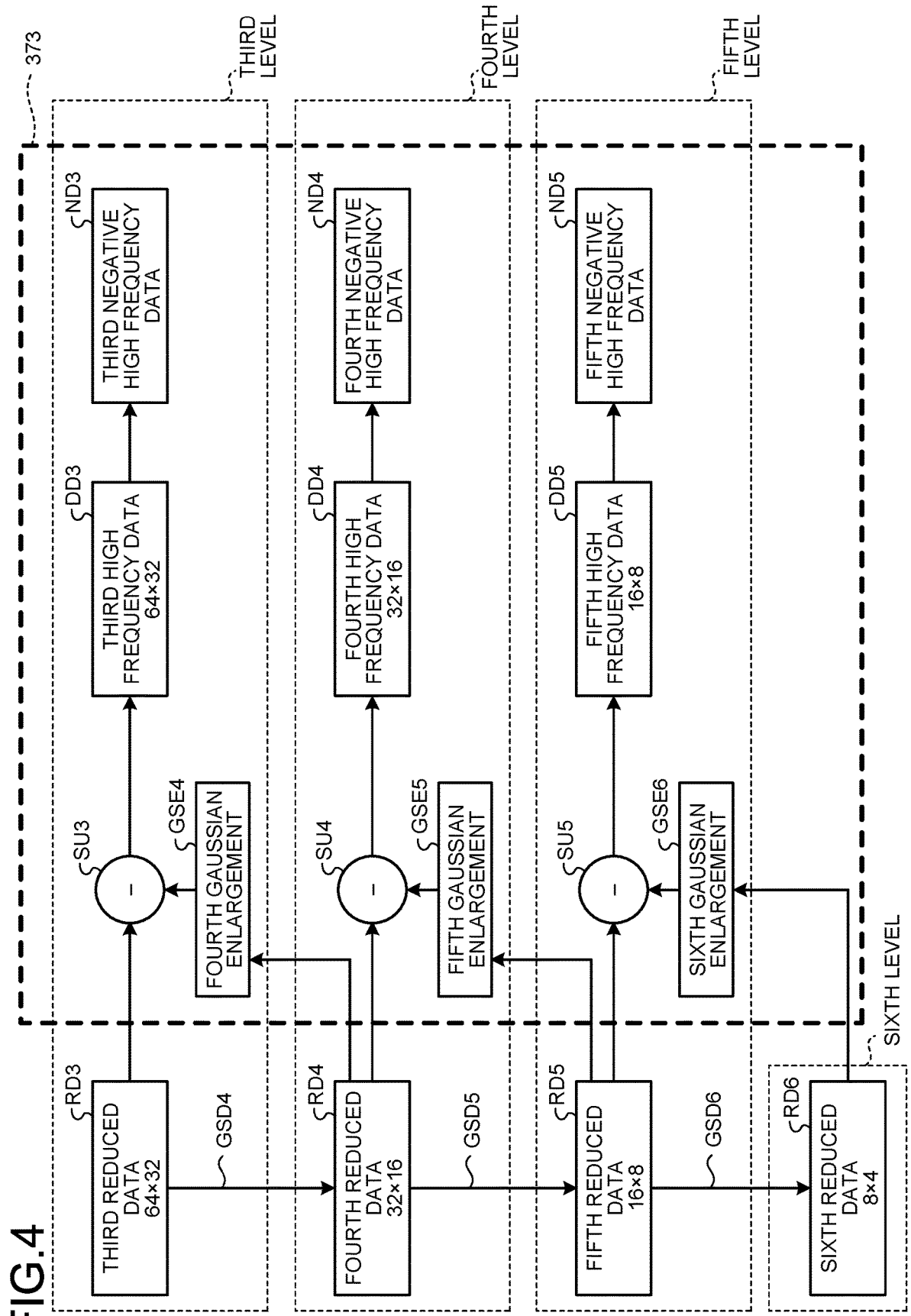
FIG. 4 is a drawing illustrating an example of a process using a Laplacian pyramid, which serves as an example of a multiresolution analysis to generate high frequency data, regarding a process performed by an extracting function, according to the first embodiment.

FIG. 4 is used for explaining a process using a Laplacian pyramid, which serves as an example of a multiresolution analysis to generate high frequency data. FIG. 4 is a drawing illustrating an example of a process performed by the multiresolution analyzing function 371. The process using the Laplacian pyramid in FIG. 4 is an example for obtaining pieces of high frequency data on different levels in the multiresolution analysis; however, possible processes are not limited to the abovementioned process. For instance, it is also acceptable to use high frequency data obtained through a multiresolution analysis using other methods.

In FIG. 4, when the sixth and the fifth levels are focused on as two adjacent levels, the reduced data (hereinafter, "higher-level data") belonging to the higher of the two adjacent levels among the plurality of gradual levels PR corresponds to the fifth reduced data RD5. The reduced data (hereinafter, "lower-level data") belonging to the lower of the two adjacent levels among the plurality of gradual levels PR corresponds to the sixth reduced data RD6. In this situation, the multiresolution analyzing function 371 is configured to perform a sixth Gaussian enlargement GSE6 corresponding to an inverse process of the sixth Gaussian reduction GSD6 on the sixth reduced data RD6 and to thus enlarge the sixth reduced data RD6 to an image size (16×8) corresponding to the fifth level. In this situation, the Gaussian enlargement denotes an image enlargement process using a Gaussian filter. The data obtained by enlarging the sixth reduced data RD6 corresponds to enlarged data. The multiresolution analyzing function 371 is configured to generate fifth high frequency data DD5 having an image size of 16×8, by subtracting (SU5) the enlarged sixth reduced data (the enlarged data) from the fifth reduced data RD5.

In FIG. 4, when the fifth and the fourth levels are focused on as two adjacent levels, higher-level data corresponds to the fourth reduced data RD4, whereas lower-level data corresponds to the fifth reduced data RD5. In this situation, the multiresolution analyzing function 371 is configured to perform a fifth Gaussian enlargement GSE5 corresponding to an inverse process of the fifth Gaussian reduction GSD5 on the fifth reduced data RD5 and to thus enlarge the fifth reduced data RD5 to an image size (32×16) corresponding to the fourth level. The data obtained by enlarging the fifth reduced data RD5 corresponds to enlarged data. The multiresolution analyzing function 371 is configured to generate fourth high frequency data DD4 having an image size of 32×16, by subtracting (SU4) the enlarged fifth reduced data (the enlarged data) from the fourth reduced data RD4.

In FIG. 4, when the fourth and the third levels are focused on as two adjacent levels, higher-level data corresponds to the third reduced data RD3, whereas lower-level data corresponds to the fourth reduced data RD4. In this situation, the multiresolution analyzing function 371 is configured to perform a fourth Gaussian enlargement GSE4 corresponding to an inverse process of the fourth Gaussian reduction GSD4 on the fourth reduced data RD4 and to thus enlarge the fourth reduced data RD4 to an image size (64×32) corresponding to the third level. The data obtained by enlarging the fourth reduced data RD4 corresponds to enlarged data. The multiresolution analyzing function 371 is configured to generate third high frequency data DD3 having an image size of 64×32, by subtracting (SU3) the enlarged fourth reduced data (the enlarged data) from the third reduced data RD3.

The multiresolution analyses illustrated in FIGS. 2 and 4 are merely examples. Possible processes performed by the multiresolution analyzing function 371 are not limited to the abovementioned processes. For example, a multiresolution analysis may be performed on the basis of other methods or numbers of pixels. The multiresolution analyzing function 371 is configured to store the plurality of pieces of low frequency data and the plurality of pieces of high frequency data that were generated, into the memory 33.

By employing the extracting function 373, the processing circuitry 37 is configured to extract, from the pieces of high frequency data, pieces of negative high frequency data (which may be referred to as a negative edge) over a range of predetermined resolutions, i.e., over a range of predetermined levels starting with the level of the lowest resolution. The pieces of negative high frequency data correspond to pieces of data having negative brightness values (negative values) in the pieces of high frequency data. For example, the extracting function 373 is configured to extract the pieces of negative high frequency data from the pieces of high frequency data, by replacing positive brightness values in the pieces of high frequency data with 0s.

More specifically, as illustrated in FIG. 4, the extracting function 373 is configured to extract the pieces of negative high frequency data from the pieces of high frequency data as structure information, over the range of the fifth to the third levels. The pieces of high frequency data correspond to data indicating a structure in the ultrasound data. For this reason, the extracting function 373 may be referred to as a structure information extracting function. In this situation, the processing circuitry 37 realizing the structure information extracting function corresponds to a structure information extracting unit. The pieces of negative high frequency data correspond to structure data indicating relatively low brightness values in the structure. Further, due to the lower resolutions thereof, the pieces of negative high frequency data in lower levels correspond to data indicating relatively low brightness regions of the ultrasound data.

Figure 5:
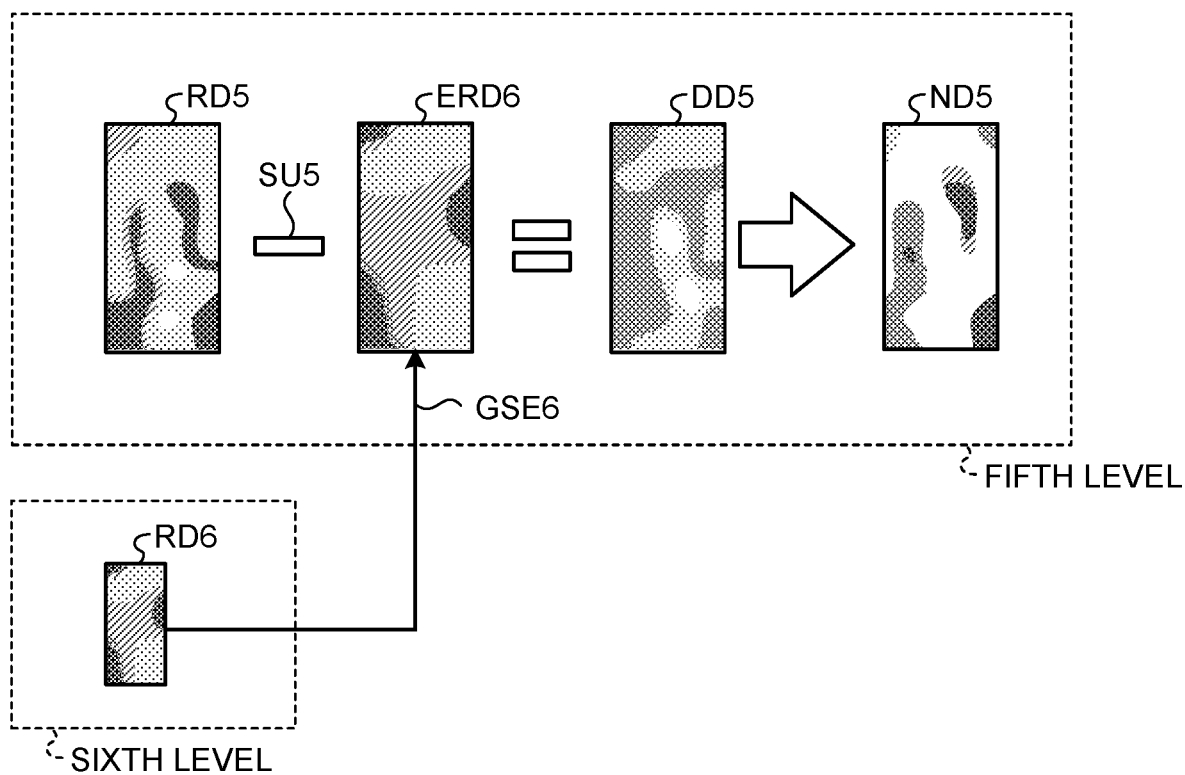
FIG. 5 is a drawing illustrating an example of extracting fifth negative high frequency data on the basis of fifth reduced data and sixth reduced data on the sixth hierarchical level and the fifth hierarchical level, according to the first embodiment.
Figure 6:
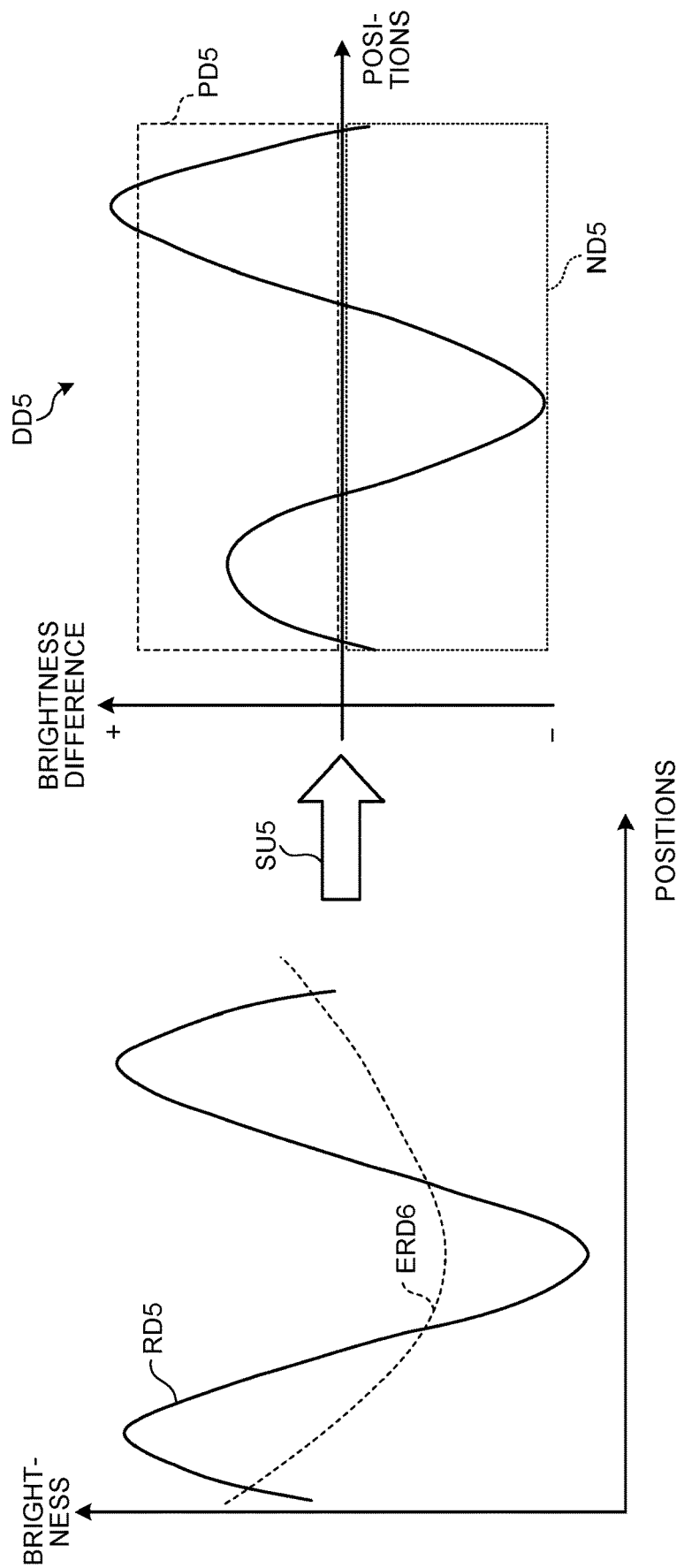
FIG. 6 is a drawing illustrating an example of extracting the fifth negative high frequency data from fifth high frequency data calculated from the fifth reduced data and enlarged sixth reduced data, according to the first embodiment.

FIG. 5 is a drawing illustrating an example of extracting fifth negative high frequency data ND5 on the basis of the fifth reduced data RD5 and enlarged sixth reduced data ERD6, on the sixth level and the fifth level. FIG. 6 is a drawing illustrating an example of extracting the fifth negative high frequency data ND5 from the fifth high frequency data DD5 calculated from the fifth reduced data RD5 and enlarged sixth reduced data ERD6. As illustrated in FIGS. 4 to 6, the extracting function 373 is configured to extract the fifth negative high frequency data ND5 from the fifth high frequency data DD5. Similarly, the extracting function 373 is configured to extract fourth negative high frequency data ND4 from the fourth high frequency data DD4 and to extract third negative high frequency data ND3 from the third high frequency data DD3.

By employing the multiresolution restoring function 375, the processing circuitry 37 is configured to generate first addition data by adding up the plurality of pieces of negative high frequency data while causing the resolutions to match over a range of predetermined resolutions. In other words, the multiresolution restoring function 375 is configured to generate the first addition data by adding up the plurality of pieces of negative high frequency data, while causing the resolutions to match over the range of the predetermined levels. Subsequently, the multiresolution restoring function 375 is configured to perform a multiresolution restoration to make the resolution of the first addition data equal to the resolution of the ultrasound data before the reduction. In the following sections, a process performed by the multiresolution restoring function 375 will be explained, with reference to FIGS. 7 and 8.

Figure 7:
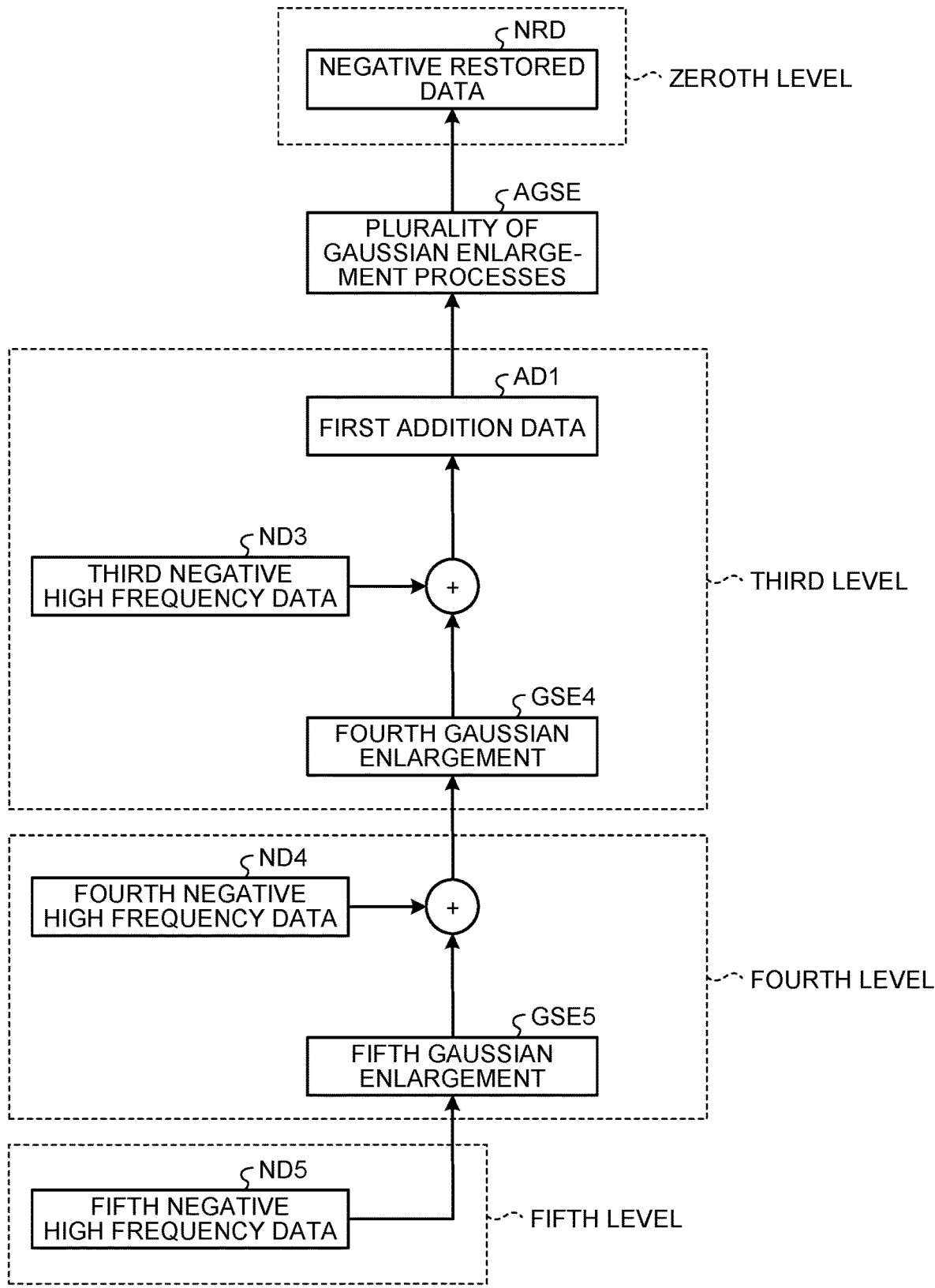
FIG. 7 is a drawing illustrating an example of a process performed by a restoring function, according to the first embodiment.
Figure 8:
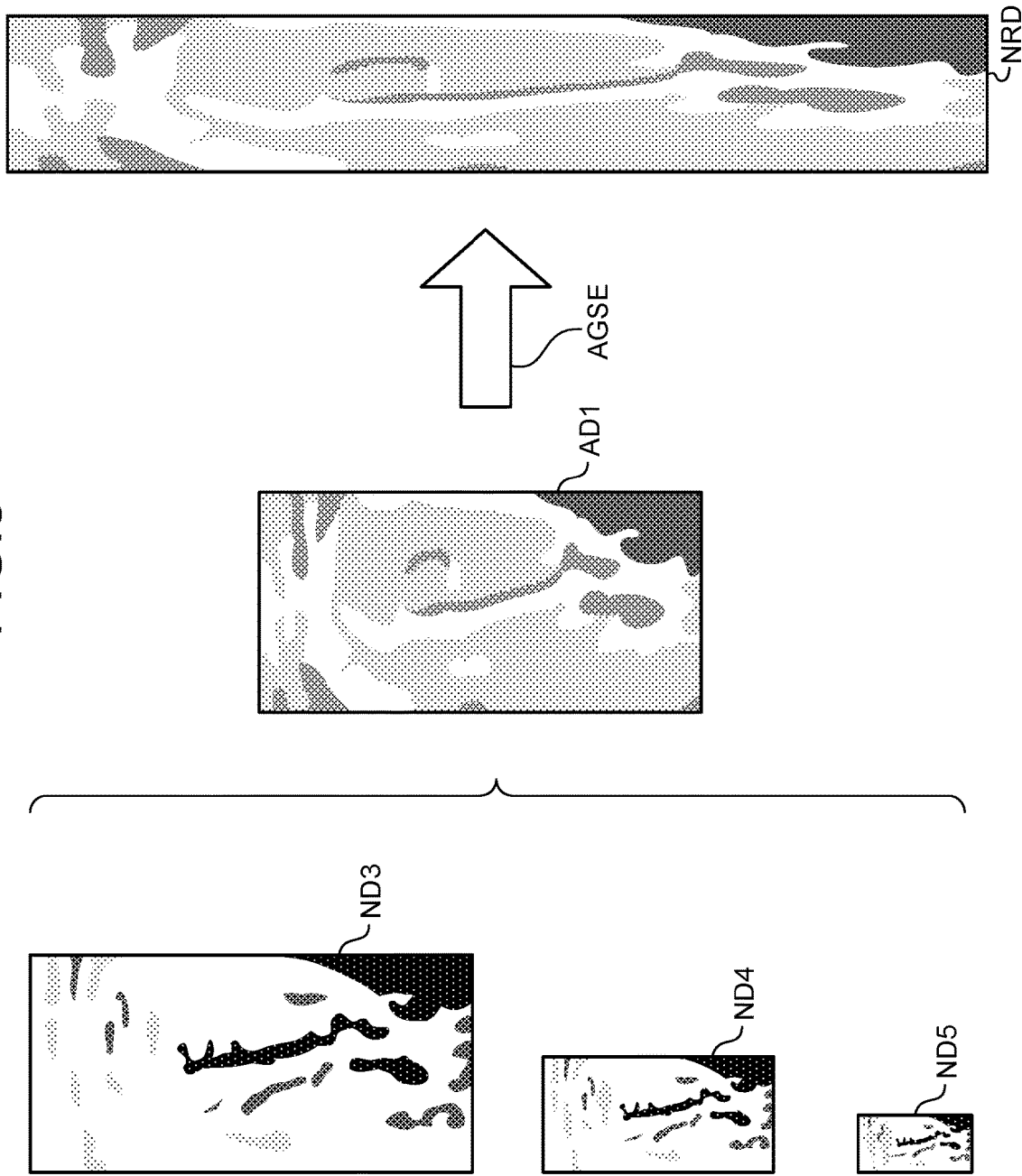
FIG. 8 is a drawing illustrating examples of images related to the process in FIG. 7, according to the first embodiment.

FIG. 7 is a drawing illustrating an example of the process performed by the multiresolution restoring function 375. FIG. 8 is a drawing illustrating examples of images related to the process in FIG. 7. In FIG. 7, a predetermined level corresponds to the third level. As illustrated in FIG. 7, the multiresolution restoring function 375 adds together the fifth negative high frequency data ND5 enlarged by the fifth Gaussian enlargement GSE5 and the fourth negative high frequency data ND4. Subsequently, the multiresolution restoring function 375 enlarges the negative high frequency data resulting from the addition by performing the fourth Gaussian enlargement GSE4 and further adds together the enlarged negative high frequency data and the third negative high frequency data ND3. As a result, as illustrated in FIG. 8, on the basis of the third negative high frequency data ND3, the fourth negative high frequency ND4, and the fifth negative high frequency data ND5, the multiresolution restoring function 375 generates first addition data AD1. As illustrated in FIGS. 7 and 8, the multiresolution restoring function 375 restores the resolution of the first addition data AD1 so as to be equal to the resolution of the ultrasound data (the original image OI) before the reduction, by performing the plurality of Gaussian enlargement processes AGSE. The resolution of the ultrasound data (the original image OI) before the reduction corresponds to the size (512×256) of the resized image RI in FIG. 2. The plurality of Gaussian enlargement processes AGSE corresponding to a restoration using the Gaussian pyramid correspond to a Gaussian enlargement putting together the following: a third Gaussian enlargement corresponding to an inverse process of the third Gaussian reduction GSD3; a second Gaussian enlargement corresponding to an inverse process of the second Gaussian reduction GSD2; and a first Gaussian enlargement corresponding to an inverse process of the first Gaussian reduction GSD1.

More specifically, the multiresolution restoring function 375 is configured to generate the negative restored data NRD illustrated in FIG. 8, by sequentially performing the third Gaussian enlargement, the second Gaussian enlargement, and the first Gaussian enlargement, on the first addition data AD1. The restored data NRD is high resolution data reflecting information of the pieces of negative high frequency data ND5, ND4, and ND3 extracted by the extracting function 373. As explained above, ND5, ND4, and ND3 are pieces of negative high frequency data on the lower levels and store therein the information indicating the relatively low brightness regions in the ultrasound data. In other words, the restored data NRD is high resolution data indicating the relative low brightness regions in the ultrasound data.

By employing the weight applying function 377, the processing circuitry 37 is configured to apply a first weight to the restored first addition data (the negative restored data NRD), in accordance with contrast of the structure of the patient's body in the original image OI. The first weight is set as a positive value, for example. It is possible to input, set, and adjust the first weight, as appropriate, according to instructions from the user received via the input interface 13. The first weight is set to a larger value, for example, at the time of emphasizing, within a combined image, a region in a cardiac chamber expected to have low brightness levels.

By employing the combining function 379, the processing circuitry 37 is configured to generate a combined image on the basis of the restored first addition data (the negative restored data NRD) and the ultrasound data. More specifically, the combining function 379 is configured to generate the combined image, by combining the restored first addition data to which the first weight was applied, with the ultrasound data. As explained above, the restored first addition data (the negative restored data NRD) is the data indicating the relatively low brightness regions in the ultrasound data and, as a result of being combined with the ultrasound data after having the first weight applied thereto, makes it possible to suppress, within the combined image, the low brightness regions in the ultrasound data (e.g., a region in a heart chamber expected to have low brightness levels) to have even lower brightness levels. It is therefore possible to emphasize the contrast between the low brightness regions and the high brightness regions in the ultrasound data.

By employing the brightness correcting function 381, the processing circuitry 37 is configured to correct brightness of the combined image. More specifically, the brightness correcting function 381 is configured to correct the brightness of the combined image, on the basis of a first average brightness value related to the ultrasound data (the original image OI) and a second average brightness value of the combined image. Even more specifically, the brightness correcting function 381 is configured to correct the brightness values of the combined image so that the second average brightness value becomes closer to the first average brightness value.

Figure 9:
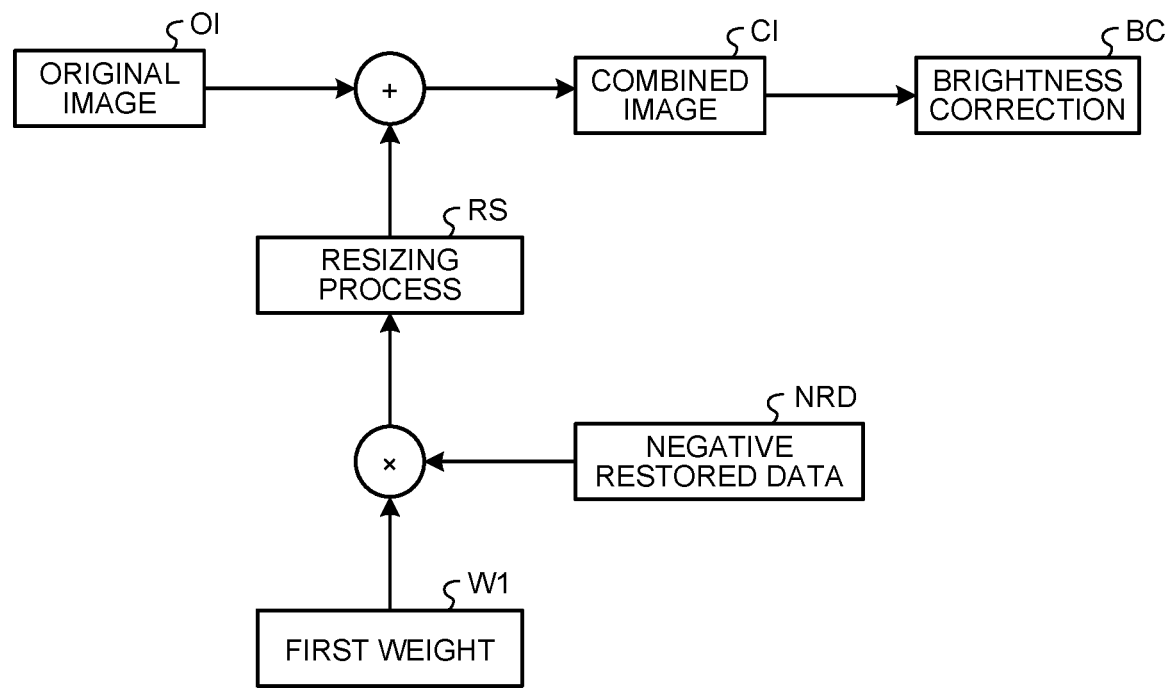
FIG. 9 is a drawing illustrating examples of processes related to a weight applying function, a combining function, and a brightness correcting function, according to the first embodiment.

In the following sections, processes related to the weight applying function 377, the combining function 379, and the brightness correcting function 381 will be explained, with reference to FIG. 9. FIG. 9 is a drawing illustrating examples of the processes related to the weight applying function 377, the combining function 379, and the brightness correcting function 381. As illustrated in FIG. 9, the weight applying function 377 is configured to apply a first weight W1 to the negative restored data NRD. The combining function 379 is configured to perform a resizing process RS on the negative restored data to which the first weight W1 was applied. As a result of the resizing process, the image size of the negative restored data to which the first weight W1 was applied becomes equal to the image size of the original image OI. The combining function 379 is configured to generate a combined image CI, by combining the resized negative restored data with the original image OI. The brightness correcting function 381 is configured to perform a brightness correction BC on the combined image CI. The combined image CI resulting from the brightness correction BC is displayed on the display 15.

The term "processor" used in the description of the controlling circuitry 35 and the processing circuitry 37 denotes, for example, a Central Processing Unit (CPU), a Graphics Processing Unit (GPU), or circuitry such as an Application Specific Integrated Circuit (ASIC) or a programmable logic device (e.g., a Simple Programmable Logic Device [SPLD], a Complex Programmable Logic Device [CPLD], or a Field Programmable Gate Array [FPGA]).

One or more processors are configured to realize various types of functions by reading and executing programs saved in the memory 33. Alternatively, instead of having the various types of programs saved in the memory 33, it is also acceptable to directly incorporate the various types of programs into the circuitry of the processor in the controlling circuitry 35 or the processing circuitry 37. In that situation, the processor is configured to realize the various types of functions by reading and executing the various types of programs incorporated in the circuitry thereof. In an example, the functions implemented by the processing circuitry 37 may be installed in the controlling circuitry 35. Conversely, the functions implemented by the controlling circuitry 35 may be installed in the processing circuitry 37.

Figure 10:
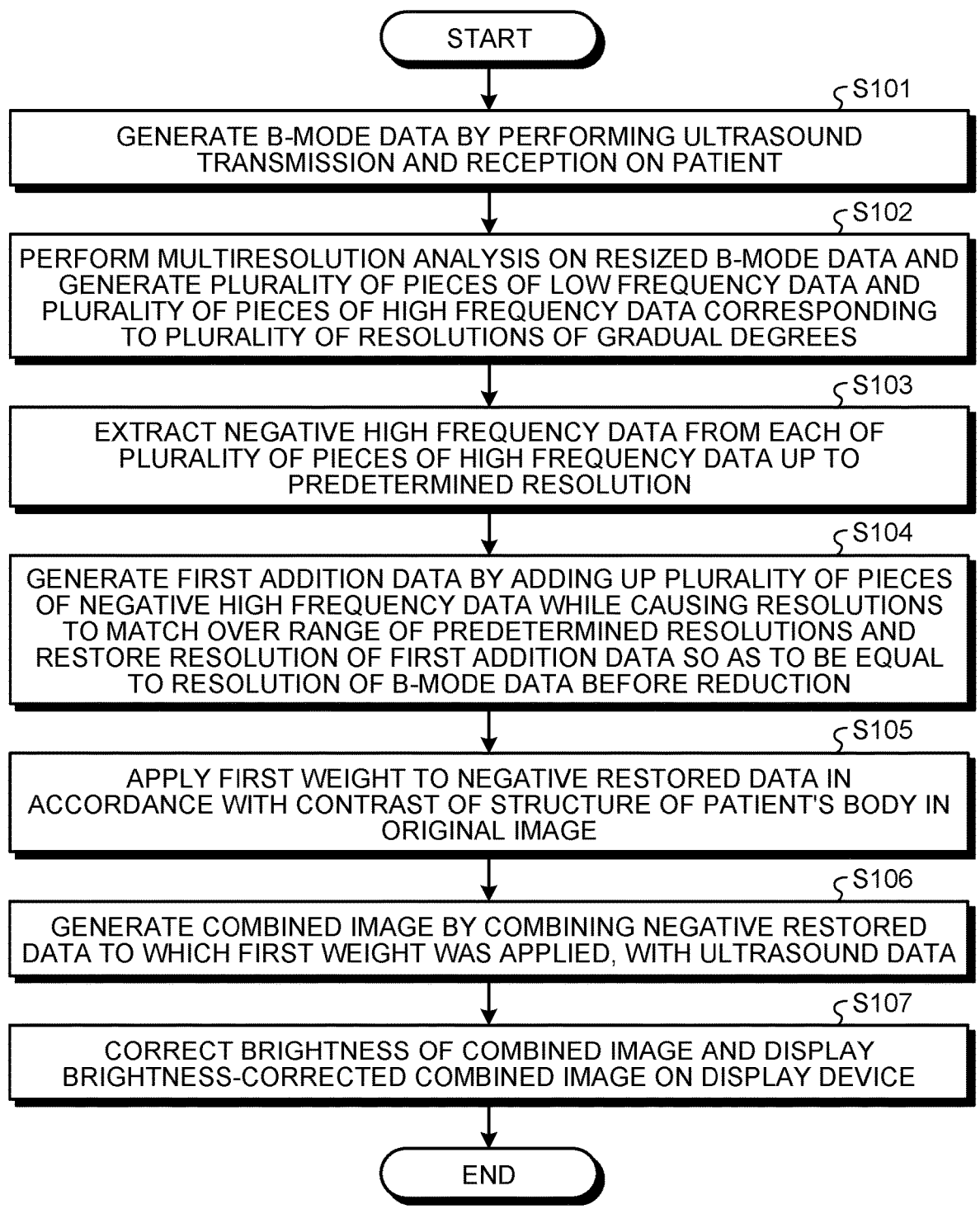
FIG. 10 is a flowchart illustrating an example of a procedure in a contrast improving process, according to the first embodiment.

A configuration according to the present embodiment has thus been explained. Next, a procedure in the contrast improving process will be explained below, with reference to FIG. 10. FIG. 10 is a flowchart illustrating an example of the procedure in the contrast improving process. To explain a specific example, it is assumed that the ultrasound data to be input to the contrast improving process is a B-mode image.

A Contrast Improving Process

Step S101

As a result of ultrasound transmission and reception performed on the patient P, B-mode data is generated as ultrasound data. Raw data such as the B-mode data is used as the original image OI illustrated in FIG. 2 and so on.

Step S102

The multiresolution analyzing function 371 performs a multiresolution analysis on the original image OI. Accordingly, the multiresolution analyzing function 371 generates, from the ultrasound data, a plurality of pieces of low frequency data and a plurality of pieces of high frequency data corresponding to a plurality of resolutions of gradual degrees (a plurality of levels).

Step S103

The extracting function 373 extracts negative high frequency data from each of the plurality of pieces of high frequency data up to a predetermined resolution.

Step S104

The multiresolution restoring function 375 generates first addition data AD1 by adding up a plurality of pieces of negative high frequency data, while causing the resolutions to match over the range of the predetermined resolutions. The multiresolution restoring function 375 restores the resolution of the first addition data AD1 so as to be equal to the resolution of the ultrasound data (the original image OI) before the reduction. The multiresolution restoring function 375 has thus generated negative restored data NRD.

Step S105

The weight applying function 377 applies the first weight W1 to the negative restored data NRD in accordance with the contrast of the structure of the patient's body in the original image OI. In this situation, it is possible to change the first weight W1, as appropriate, according to an instruction from the user regarding a combined image CI displayed on the display 15.

Step S106

The combining function 379 generates the combined image CI by combining the negative restored data to which the first weight W1 was applied, with the ultrasound data. As a result, artifacts are decreased in non-structure parts (e.g., a heart chamber) of the combined image CI.

Step S107

The brightness correcting function 381 corrects brightness of the combined image CI. The image generating circuitry 29 performs a scan convert process on the combined image CI of which the brightness has been corrected. The display 15 displays the combined image CI resulting from the scan convert process. When a B-mode image is used as the original image OI, the scan convert process at the present step is unnecessary.

The ultrasound diagnosis apparatus 1 according to the first embodiment described above is configured to generate, from the ultrasound data, the plurality of pieces of low frequency data and the plurality of pieces of high frequency data corresponding to the plurality of resolutions of the gradual degrees; to extract the pieces of negative high frequency data over the range of the predetermined resolutions, from the plurality of pieces of high frequency data; to restore the resolution of the first addition data so as to be equal to the resolution of the ultrasound data before the reduction, the first addition data being obtained by adding up the pieces of negative high frequency data while causing the resolutions to match over the range of the predetermined resolutions; to generate the combined image CI on the basis of the restored first addition data and the ultrasound data; and to display the combined image CI.

Figure 11:
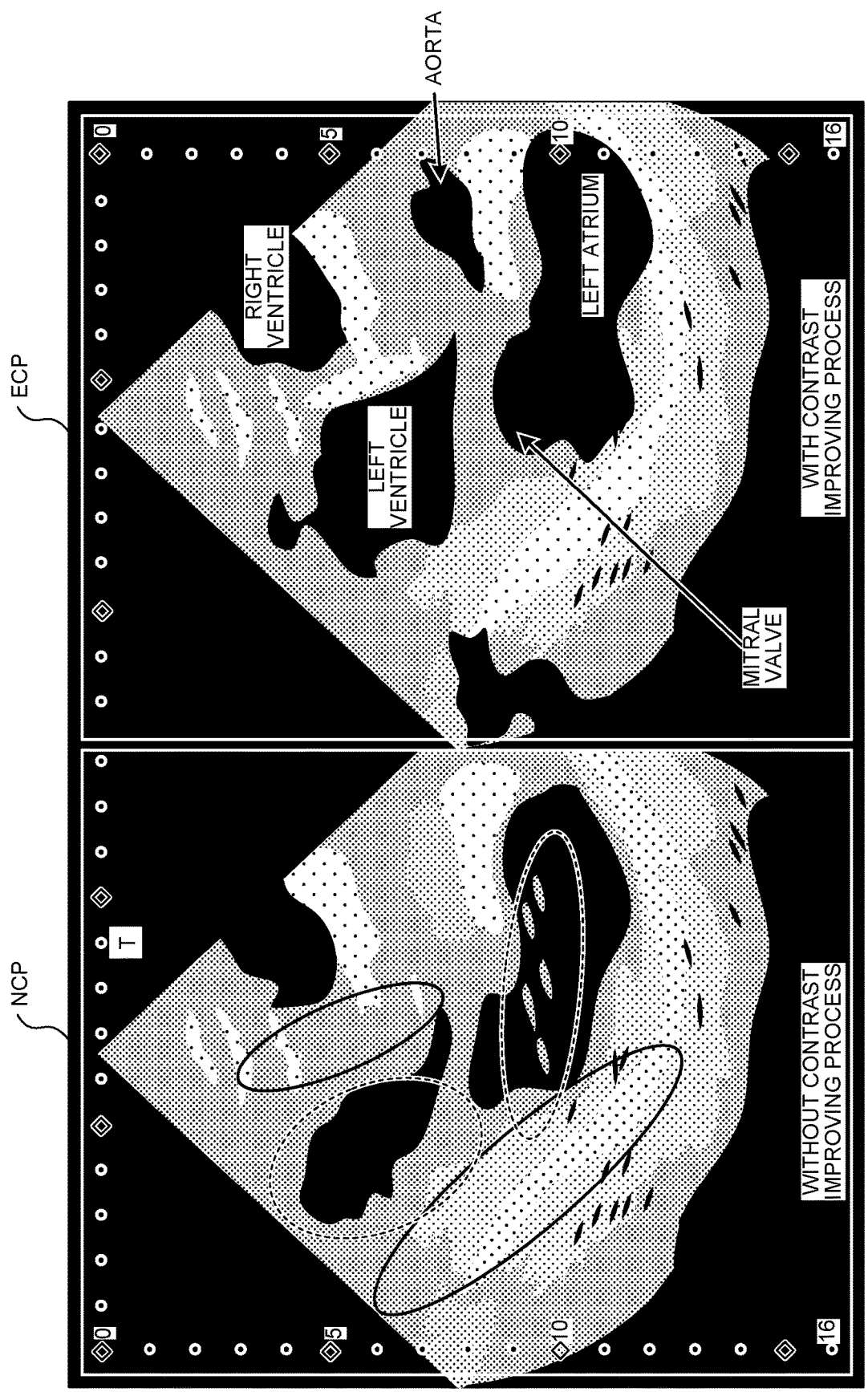
FIG. 11 is a drawing illustrating an example of comparison between using and not using the contrast improving process, according to the first embodiment.

In other words, the ultrasound diagnosis apparatus 1 in the present example is configured to selectively extract the pieces of negative high frequency data serving as the negative edge, from the low resolution data obtained through the multiresolution analysis. As a result of performing the multiresolution restoration, applying the weights, and combining the result with the ultrasound data, it is possible to selectively correct the brightness levels of relatively low brightness regions (e.g., a heart chamber) within a schematic structure of the patient's body in the ultrasound image. FIG. 11 is a drawing illustrating an example of comparison between using and not using the contrast improving process performed by the ultrasound diagnosis apparatus 1 in the present example. In FIG. 11, the dotted-line enclosures represent heart chamber regions, whereas the solid-line enclosures represent myocardium regions (a biological structure) subject to observation. The heart chamber regions are expected to have lower brightness levels. As indicated by NCP in FIG. 11, when the contrast improving process is not performed, artifacts appear in a heart chamber region. In contrast, as indicated by ECP in FIG. 11, when the contrast improving process is performed, the inside of the heart chamber regions has lower brightness levels, and artifacts are suppressed. As illustrated in FIG. 11, by using the ultrasound diagnosis apparatus 1 in the present example, it is possible to suppress signal intensities of the artifacts in the regions (e.g., the heart chamber regions) that are spatially other than the biological structure. As a result, the differences in signal intensities between the biological information in the ultrasound data and the artifacts are increased. It is therefore possible to improve visibility of the biological information in the ultrasound image.

Figure 12:
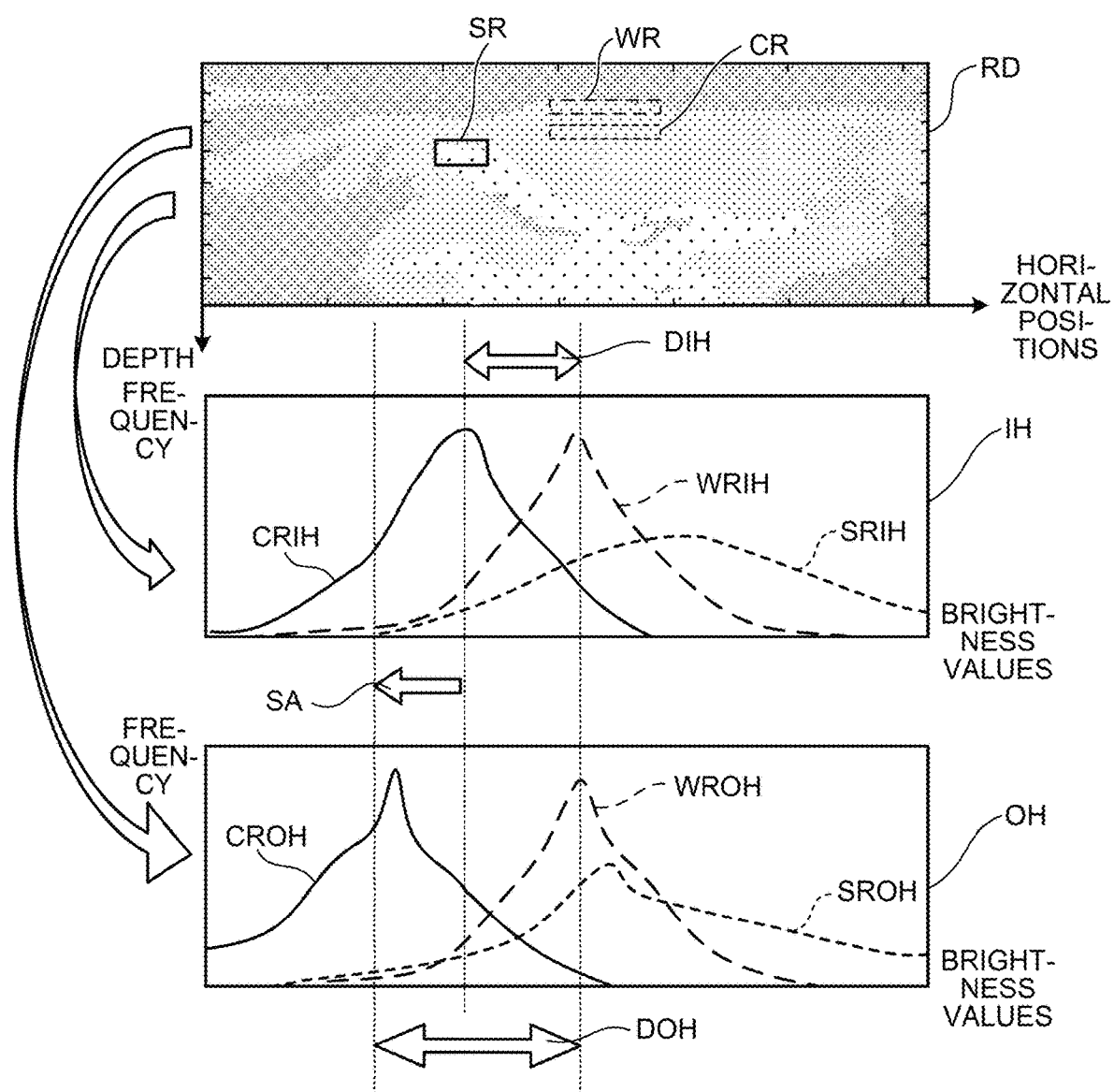
FIG. 12 is a drawing illustrating an example of advantageous effects of the contrast improving process, according to the first embodiment.

FIG. 12 is a drawing illustrating an example of advantageous effects of the contrast improving process. In raw data RD in B-mode illustrated in FIG. 12, a septum region SR of the heart is indicated with a dotted-line box, while a cardiac wall region WR of the heart is indicated with a long-dashed-line box, and the heart chamber region CR of the heart is indicated with a solid-line box. With respect to the raw data RD, a histogram IH indicating brightness values before being input to the contrast improving process exhibits a histogram SRIH of brightness values in the septum region SR, a histogram WRIH of brightness values in the cardiac wall region WR, and a histogram CRIH of brightness values in the heart chamber region CR. With respect to the raw data, a histogram OH indicating brightness values after being output from the contrast improving process exhibits a histogram SROH of brightness values in the septum region SR, a histogram WROH of brightness values in the cardiac wall region WR, and a histogram CROH of brightness values in the heart chamber region CR. The histogram SRIH, the histogram SROH, the histogram WRIH, and the histogram WROH indicate biological information. The histogram CRIH and the histogram CROH indicate artifacts in the heart chamber region.

As observed from the histogram IH and the histogram OH in FIG. 12, the difference DOH between the peak value of frequency of the brightness values in the histogram WROH and the peak value of frequency of the brightness values in the histogram SROH is larger than the difference DIH between the peak value of frequency of the brightness values in the histogram WRIH and the peak value of frequency of the brightness values in the histogram SRIH. In other words, the peak value of the frequency of the brightness values in the histogram SROH has a brightness value decreased from the peak value of the frequency of the brightness values in the histogram SRIH. As observed from the histogram IH and the histogram OH in FIG. 12, the contrast improving process decreases the brightness values of the artifacts and the like in the heart chamber region, while maintaining the brightness values of the biological structure. In other words, because of the decrease SA in the peak value, the ratio of the artifacts (the histogram CROH) to the biological information (the histogram SROH and the histogram WRIH) is improved, as illustrated in FIG. 12.

Consequently, by using the ultrasound diagnosis apparatus 1 in the present example, it is possible to enhance visibility of the septum region SR and the cardiac wall region WR against the heart chamber region CR. In other words, because the ultrasound diagnosis apparatus 1 in the present example is configured to perform the contrast improving process by using spatial information of the ultrasound data, it is possible to improve the visibility of the biological information in the ultrasound data in which it would be difficult to separate the biological information from artifacts when using signal intensity information alone.

Further, the ultrasound diagnosis apparatus 1 in the present example is capable of performing the contrast improving process on the ultrasound data acquired in a real-time manner. The contrast improving process is thus performed in accordance with characteristics of the ultrasound data. Consequently, the ultrasound diagnosis apparatus 1 in the present example is capable of displaying the ultrasound image in which visibility of the biological information in the ultrasound image is enhanced, without the need to establish display settings of the ultrasound images every time ultrasound data is acquired. It is therefore possible to enhance throughput of diagnosing processes, to enhance operability, and to enhance efficiency in diagnosing processes.

In addition, the ultrasound diagnosis apparatus 1 in the present example is configured to generate the combined image CI, by applying the first weight W1 corresponding to the contrast of the structure to the restored first addition data NRD and further combining the first addition data to which the first weight W1 was applied with the ultrasound data. In this situation, it is possible to adjust the first weight W1 as appropriate according to an instruction from the user received via the input interface 13. Accordingly, the ultrasound diagnosis apparatus 1 in the present example is able to display, on the display 15, the combined image CI by appropriately setting the extent to which the artifacts are decreased by the contrast improving process, in accordance with settings desired by the user or default settings.

Furthermore, the ultrasound diagnosis apparatus 1 in the present example is configured to correct the brightness of the combined image CI on the basis of the first average brightness value related to the ultrasound data and the second average brightness value of the combined image CI and to further display the combined image CI of which the brightness has been corrected. As a result, the ultrasound diagnosis apparatus 1 in the present example is capable of decreasing the situations where the combined image CI is darkened due to the decrease of the artifacts. It is therefore possible to display the ultrasound image in which visibility of the biological information in the ultrasound image is enhanced.

First Application Example

In a first application example, a weight (hereinafter, "second weight") is applied to negative high frequency data, in correspondence with a plurality of levels. For example, when a predetermined resolution is the highest resolution, the extracting function 373 is configured to generate a plurality of pieces of negative high frequency data corresponding to a plurality of resolutions, on the basis of pieces pf high frequency data corresponding to the resolutions of all the gradual degrees related to a multiresolution analysis. The multiresolution restoring function 375 is configured to generate first addition data by adding up the pieces of negative high frequency data to which the second weights were applied, while causing the resolutions to match over a range of predetermined resolutions. Because the technical concept related to the generation of the plurality of pieces of high frequency data and the plurality of pieces of negative high frequency data is the same as that in the first embodiment, detailed explanations thereof will be omitted. In the following sections, to explain a specific example, it is assumed that the predetermined resolution is the highest resolution corresponding to the zeroth level, whereas the level corresponding to the lowest resolution is the fifth level.

Figure 13:
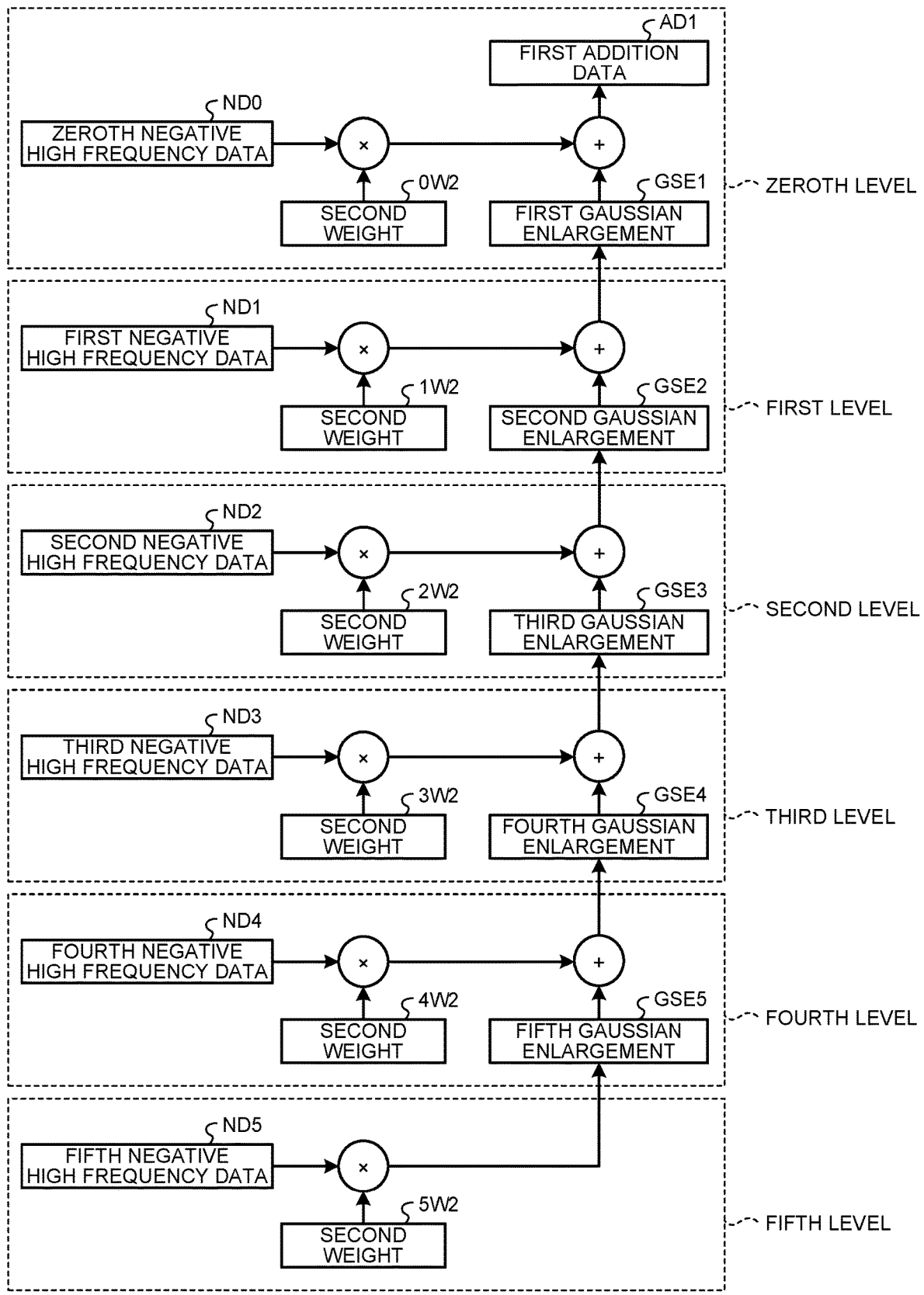
FIG. 13 is a chart illustrating an example of applying second weights to negative high frequency data in accordance with hierarchical levels, according to a first application example of the first embodiment.

FIG. 13 is a chart illustrating an example of applying the second weights to the negative high frequency data in accordance with the resolutions. As illustrated in FIG. 13, a plurality of pieces of negative high frequency data (ND0 to ND5) are extracted over the range of the zeroth to the fifth levels. A plurality of second weights (0W2 to 5W2) in FIG. 13 are mutually different in correspondence with the levels corresponding to the resolutions.

In accordance with the levels to which the pieces of negative high frequency data belong, the weight applying function 377 is configured to apply the second weights (0W2 to 5W2) to the pieces of negative high frequency data (ND0 to ND5). The second weights (0W2 to 5W2) corresponding to the levels, i.e., the plurality of second weights (0W2 to 5W2) respectively corresponding to the plurality of levels are each a positive value larger than 0, for example, and are stored in the memory 33 in advance. In this situation, it is possible to set, change, and adjust the plurality of second weights (0W2 to 5W2), as appropriate, according to instructions from the user received via the input interface 13.

The multiresolution restoring function 375 is configured to generate first addition data AD1, by sequentially adding up the plurality of pieces of negative high frequency data to which the plurality of second weights (0W2 to 5W2) were applied respectively, while causing the resolutions to match over a range of predetermined resolutions starting with the lowest resolution. More specifically, the multiresolution restoring function 375 is configured to enlarge the fifth negative high frequency data ND5 to which the second weight 5W2 corresponding to the fifth level was applied, by performing the fifth Gaussian enlargement GSE5. The multiresolution restoring function 375 is configured to add together, on the fourth level, the negative high frequency data enlarged by the fifth Gaussian enlargement GSE5 and the fourth negative high frequency data ND4 to which the second weight 4W2 corresponding to the fourth level was applied.

The multiresolution restoring function 375 is configured to enlarge the negative high frequency data resulting from the addition on the fourth level by performing the fourth Gaussian enlargement GSE4, and to further add together, on the third level, the enlarged negative high frequency data and the third negative high frequency data ND3 to which the second weight 3W2 corresponding to the third level was applied. The multiresolution restoring function 375 is configured to enlarge the negative high frequency data resulting from the addition on the third level by performing the third Gaussian enlargement GSE3, and to further add together, on the second level, the enlarged negative high frequency data and the second negative high frequency data ND2 to which the second weight 2W2 corresponding to the second level was applied. The multiresolution restoring function 375 is configured to enlarge the negative high frequency data resulting from the addition on the second level by performing the second Gaussian enlargement GSE2 and to further add together, on the first level, the enlarged negative high frequency data and the first negative high frequency data ND1 to which the second weight 1W2 corresponding to the first level was applied. The multiresolution restoring function 375 is configured to enlarge the negative high frequency data resulting from the addition on the first level by performing the first Gaussian enlargement GSE1, and to further add together, on the zeroth level, the enlarged negative high frequency data and the zeroth negative high frequency data ND0 to which the second weight 0W2 corresponding to the zeroth level was applied.

As a result, as illustrated in FIG. 13, the multiresolution restoring function 375 has generated the first addition data AD1, on the basis of the plurality of pieces of negative high frequency data (ND0 to ND5) and the plurality of second weights (0W2 to 5W2). As illustrated in FIG. 12, the first addition data AD1 in the present application example corresponds to the negative restored data NRD illustrated in FIG. 6.

Further, for example, when the second weight 0W2 corresponding to the zeroth level, the second weight 1W2 corresponding to the first level, and the second weight 2W2 corresponding to the second level are each a zero weight, whereas the second weight 3W2 corresponding to the third level, the second weight 4W2 corresponding to the fourth level, and the second weight 5W2 corresponding to the fifth level are each 1, the present application example is the same as the first embodiment. In other words, according to the present application example, by applying the second weights to the pieces of negative high frequency data in accordance with the levels, it is possible to adjust, as appropriate, the pieces of negative high frequency data that contribute to the first addition data AD1.

The ultrasound diagnosis apparatus 1 according to the first application example of the first embodiment described above is configured to generate the first addition data AD1, by applying the second weights W2 corresponding to the levels to which the pieces of negative high frequency data belong, to the pieces of negative high frequency data, and further adding up the pieces of negative high frequency data to which the second weights W2 were applied while causing the resolutions to match over the range of the predetermined resolutions. In this situation, it is possible to adjust the second weights W2, as appropriate, according to an instruction from the user received via the input interface 13. As a result, the ultrasound diagnosis apparatus 1 in the present example is capable of setting each of the second weights W2 in accordance with the plurality of levels and thus expanding the width for the adjustment of the contrast of the combined image CI. Accordingly, the ultrasound diagnosis apparatus 1 in the present example is able to display the combined image CI on the display 15, by setting even more appropriately the extent to which the artifacts are decreased by the contrast improving process, in accordance with settings desired by the user or default settings. Consequently, the ultrasound diagnosis apparatus 1 in the present example is capable of further enhancing visibility related to the biological information. Because the other advantageous effects are the same as those of the first embodiment, explanations thereof will be omitted.

Second Application Example

In a second application example, pieces of positive high frequency data are extracted over a range of predetermined resolutions, so that a combined image CI is generated on the basis of the extracted pieces of positive high frequency data, pieces of negative high frequency data, and ultrasound data. Fifth positive high frequency data PD5 corresponds to the data illustrated in FIG. 6, for example. In the following sections, to explain a specific example, it is assumed that a predetermined level is the third level, similarly to the first embodiment.

Figure 14:
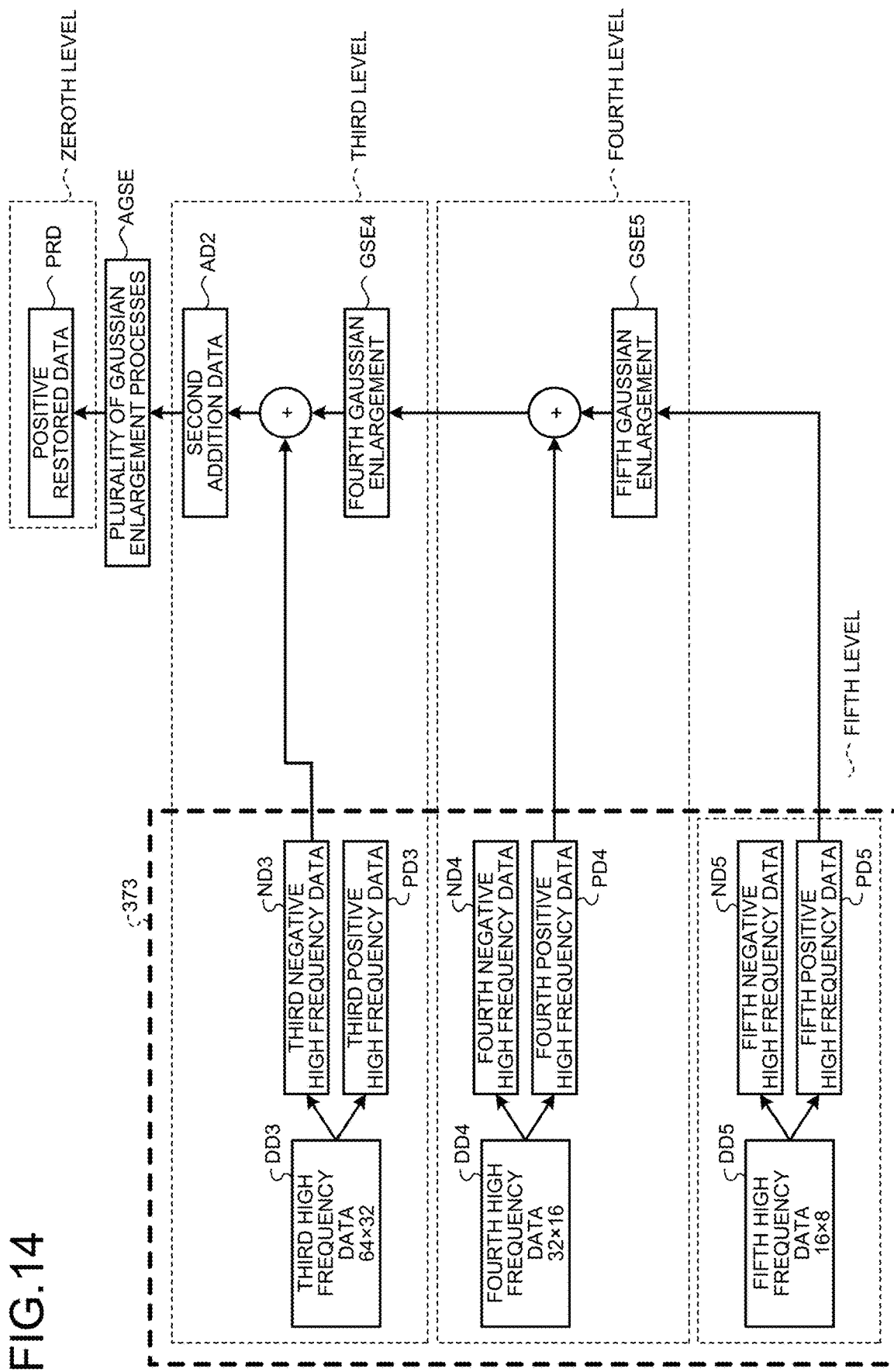
FIG. 14 is a drawing illustrating an example of a process of generating positive restored data, on the basis of positive high frequency data extracted by an extracting function, according to a second application example of the first embodiment.

FIG. 14 is a drawing illustrating an example of a process of generating positive restored data, on the basis of pieces of positive high frequency data extracted by the extracting function 373. As illustrated in FIG. 14, the extracting function 373 is configured to extract, from the pieces of high frequency data, pieces of positive high frequency data, which may be referred to as a positive edge, over a range of predetermined resolutions starting with the lowest resolution. The pieces of positive high frequency data correspond to pieces of data having positive brightness values (positive values) in the pieces of high frequency data, as illustrated in FIG. 6. For example, the extracting function 373 is configured to extract the pieces of positive high frequency data from the pieces of high frequency data, by replacing negative brightness values in the pieces of high frequency data with 0s. As illustrated in FIG. 14, the extracting function 373 is configured to extract the fifth positive high frequency data PD5 from the fifth high frequency data DD5, to extract fourth positive high frequency data PD4 from the fourth high frequency data DD4, and to extract third positive high frequency data PD3 from the third high frequency data DD3.

The multiresolution restoring function 375 is configured to generate second addition data AD2, by adding up the plurality of pieces of positive high frequency data, while causing the resolutions to match over a range of predetermined resolutions. Subsequently, the multiresolution restoring function 375 is configured to restore the resolution of the second addition data AD2 so as to be equal to the resolution of the ultrasound data before the reduction. As illustrated in FIG. 14, the multiresolution restoring function 375 is configured to add together the fifth positive high frequency data PD5 enlarged by the fifth Gaussian enlargement GSE5 and the fourth positive high frequency data PD4. Subsequently, the multiresolution restoring function 375 is configured to enlarge the positive high frequency data resulting from the addition by performing the fourth Gaussian enlargement GSE4 and to add together the enlarged positive high frequency data and the third positive high frequency data PD3. As a result, as illustrated in FIG. 14, the multiresolution restoring function 375 has generated the second addition data AD2 on the basis of the third positive high frequency data PD3, the fourth positive high frequency data PD4, and the fifth positive high frequency data PD5.

As illustrated in FIG. 14, by performing a plurality of Gaussian enlargement processes AGSE, the multiresolution restoring function 375 is configured to restore the resolution of the second addition data AD1 so as to be equal to the resolution of the ultrasound data (the original image OI) before the reduction. The resolution of the ultrasound data (the original image OI) before the reduction corresponds to the resolution (512×256) of the resized image RI in FIG. 2. The plurality of Gaussian enlargement processes AGSE corresponding to a restoration using a Gaussian pyramid correspond to a Gaussian enlargement obtained by putting together the third Gaussian enlargement GSE3, the second Gaussian enlargement GSE2, and the first Gaussian enlargement GSE1. More specifically, the multiresolution restoring function 375 is configured to generate positive restored data PRD illustrated in FIG. 14, by sequentially performing the third Gaussian enlargement, the second Gaussian enlargement, and the first Gaussian enlargement on the second addition data AD2.

The weight applying function 377 is configured to apply a third weight to the restored second addition data (the positive restored data PRD) in accordance with contrast of the structure of the patient's body in the original image OI. The third weight is set to be a negative value, for example. It is possible to input, set, and adjust the third weight, as appropriate, according to an instruction from the user received via the input interface 13.

The combining function 379 is configured to generate a combined image CI on the basis of negative restored data NRD, the positive restored data PRD, and the ultrasound data. More specifically, the combining function 379 is configured to generate the combined image CI by combining together the first addition data NRD to which the first weight was applied and which was restored, the second addition data PRD to which the second weight was applied and which was restored, and the ultrasound data.

On the basis of the first average brightness value related to the ultrasound data (the original image OI) and the second average brightness value of the combined image CI, the brightness correcting function 381 is configured to correct brightness values of the combined image CI so that the second average brightness value becomes closer to the first average brightness value. The image generating circuitry 29 is configured to perform a scan convert process on the combined image CI of which the brightness has been corrected. The display 15 is configured to display the combined image CI resulting from the scan convert process.

Figure 15:
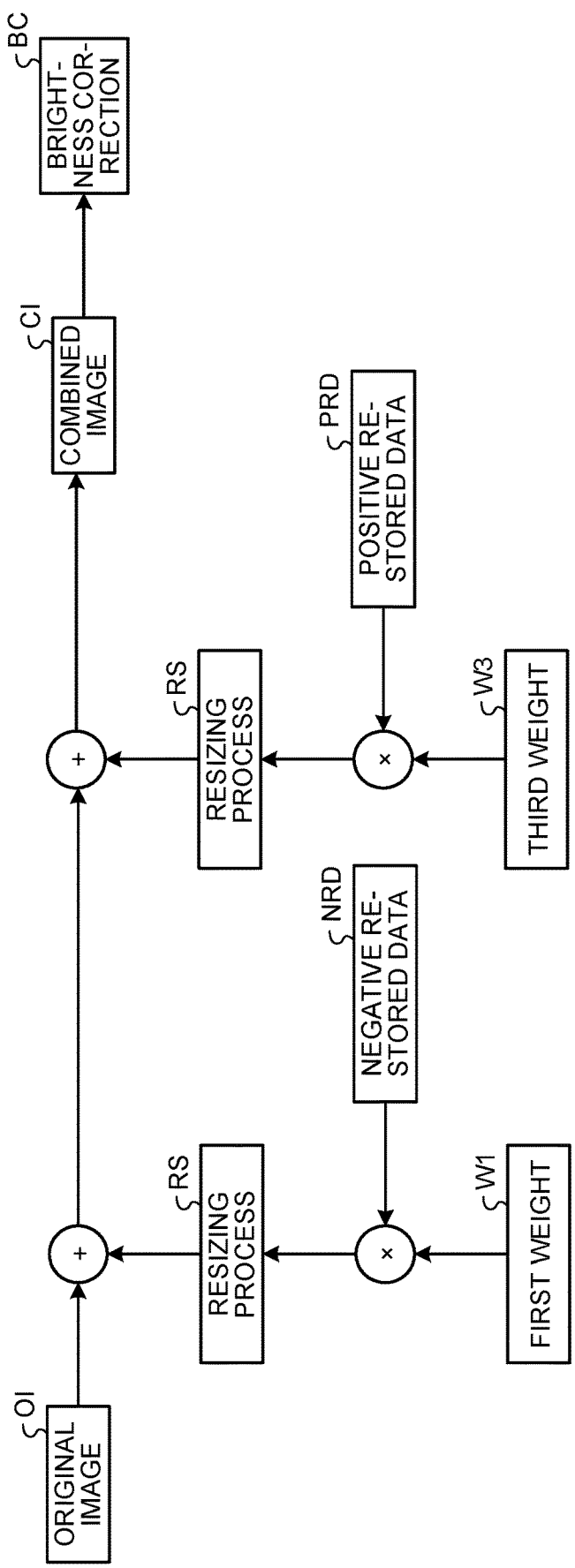
FIG. 15 is a drawing illustrating an example of a process related to a weight applying function, a combining function, and a brightness correcting function, according to the second application example of the first embodiment.

In the following sections, processes related to the weight applying function 377, the combining function 379, and the brightness correcting function 381 will be explained, with reference to FIG. 15. FIG. 15 is a drawing illustrating an example of a process related to the weight applying function 377, the combining function 379, and the brightness correcting function 381. As illustrated in FIG. 15, the weight applying function 377 is configured to apply the first weight W1 to the negative restored data NRD and to apply the third weight W3 to the positive restored data PRD. The combining function 379 is configured to perform a resizing process RS on the negative restore data to which the first weight W1 was applied and on the positive restored data to which the third weight W3 was applied. As a result of the resizing process, the image size of the negative restored data to which the first weight W1 was applied and the image size of the negative restored data to which the third weight W3 was applied are each equal to the image size of the original image OI. The combining function 379 is configured to generate a combined image CI, by combining together the resized negative restored data, the resized positive restored data, and the original image OI. The brightness correcting function 381 is configured to perform a brightness correction BC on the combined image CI. The combined image CI resulting from the brightness correction BC is displayed on the display 15.

The ultrasound diagnosis apparatus 1 according to the second application example of the first embodiment described above is configured to: extract, from the pieces of high frequency data corresponding to the plurality of resolutions of the gradual degrees, the pieces of positive high frequency data over the range of the predetermined resolutions among the plurality of resolutions of the gradual degrees; to restore the resolution of the second addition data AD2 so as to be equal to the resolution of the ultrasound data before the reduction, the second addition data AD2 being obtained by adding up the extracted pieces of positive high frequency data while causing the resolutions to match over the range of the predetermined resolutions; to apply the third weight W3 to the restored second addition data PRD, in accordance with the contrast of the structure; and to generate the combined image CI by combining together the first addition data NRD to which the first weight W1 was applied, the second addition data RPD to which the third weight W3 was applied, and the ultrasound data. In this situation, it is possible to adjust the third weight W3 as appropriate, according to an instruction from the user received via the input interface 13.

As a result, the ultrasound diagnosis apparatus 1 in the present example is capable of appropriately setting the brightness levels of the biological information realized by the contrast improving process, in accordance with settings desired by the user or default settings. Accordingly, the ultrasound diagnosis apparatus 1 in the present example is capable of appropriately setting the contrast between the biological information and non-biological information (e.g., a heart chamber) in the combined image CI and is thus able to further enhance visibility related to the biological information in the combined image CI. Further, by appropriately adjusting the third weight W3, it is possible to emphasize the biological information in the combined image CI.

Further, the ultrasound diagnosis apparatus 1 in the present example is capable of decreasing the brightness values in the region rendering the biological information, in accordance with the decrease in the brightness values in the region rendering the non-biological information. It is therefore possible to decrease saturation of brightness values (whiteout) in the region rendering the biological information that may be caused by the brightness correction BC, i.e., it is possible to suppress brightness saturation. Consequently, the ultrasound diagnosis apparatus 1 in the present example is capable of further enhancing visibility related to the biological information in the combined image CI. Because the other advantageous effects are the same as those of the first embodiment, explanations thereof will be omitted.

Third Application Example

In a third application example, weights (hereinafter, "fourth weights") are applied to pieces of positive high frequency data in accordance with a plurality of resolutions of gradual degrees. For example, when the level corresponding to a predetermined resolution is the zeroth level, the extracting function 373 is configured to generate high frequency data indicating a plurality of differences between a plurality of resolutions excluding the lowest resolution from the resolutions of all the gradual degrees related to the multiresolution analysis and the resolution (the resolution of the resized image RI) before the first Gaussian reduction GSD1 is performed. The extracting function 373 is configured to generate a plurality of pieces of positive high frequency data corresponding to the plurality of resolutions, on the basis of the plurality of pieces of high frequency data. Because the technical concept related to the generation of the plurality of pieces of high frequency data and the plurality of pieces of positive high frequency data is the same as that in the first embodiment and in the second application example, detailed explanations thereof will be omitted. In the following sections, to explain a specific example, it is assumed that the predetermined resolution is the zeroth level corresponding to the highest resolution, while the level corresponding to the lowest resolution is the fifth level.

Figure 16:
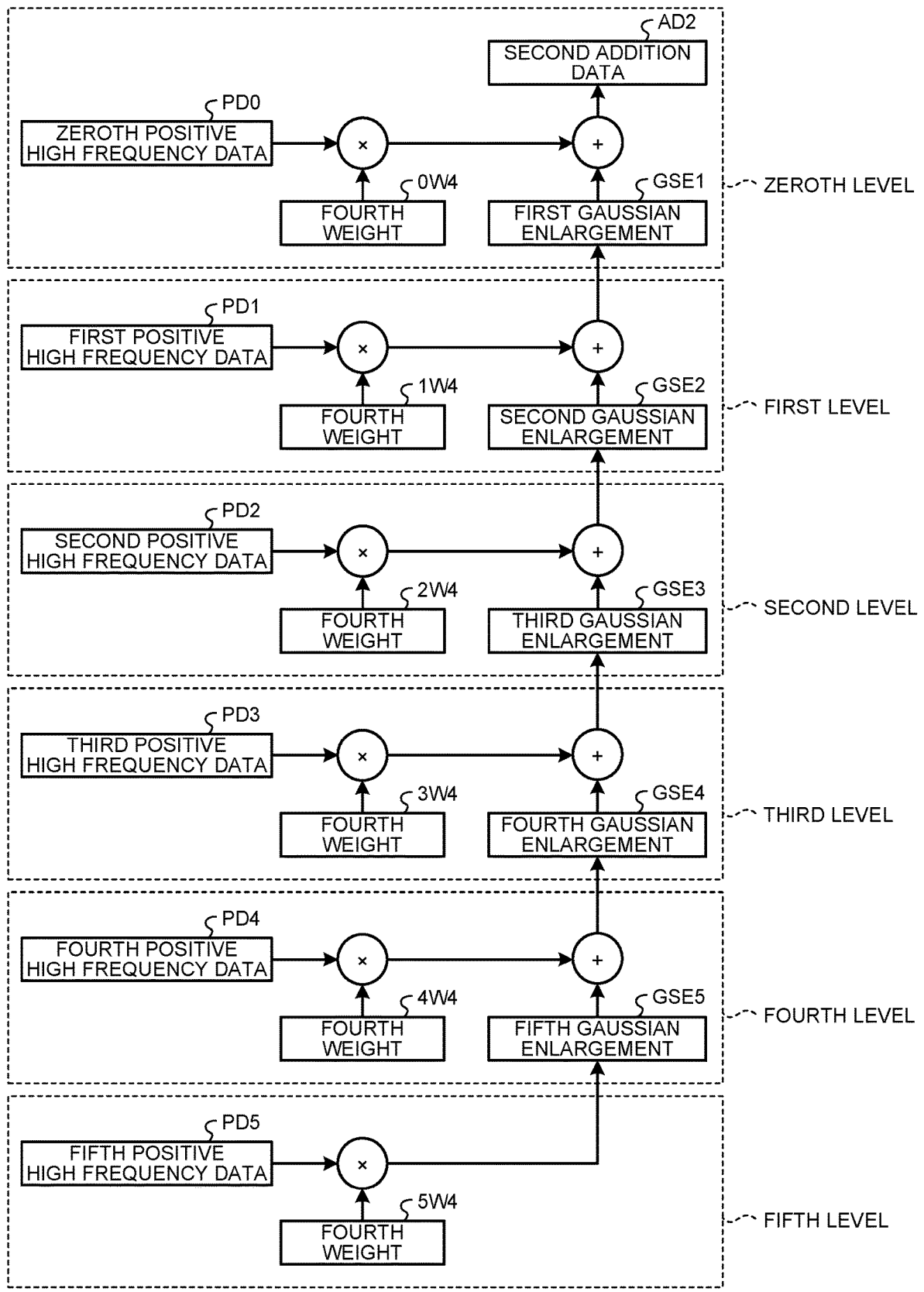
FIG. 16 is a drawing illustrating an example of applying fourth weights to negative high frequency data in accordance with hierarchical levels, according to a third application example of the first embodiment.

FIG. 16 is a drawing illustrating an example of applying the fourth weights to the pieces of negative high frequency data in accordance with the resolutions. As illustrated in FIG. 16, a plurality of pieces of positive high frequency data (PD0 to PD5) are extracted over the range of the zeroth to the fifth levels. A plurality of fourth weights (0W4 to 5W4) in FIG. 16 are mutually different in correspondence with the levels indicating the image sizes.

The weight applying function 377 is configured to apply the fourth weights (0W4 to 5W4) to the pieces of positive high frequency data (PD0 to PD5) in accordance with the levels to which the pieces of positive high frequency data belong. The fourth weights corresponding to the levels, i.e., the plurality of fourth weights (0W4 to 5W4) respectively corresponding to the plurality of levels are each a negative value smaller than 0, for example, and are stored in the memory 33 in advance. In this situation, it is possible to set, change, and adjust the plurality of fourth weights (0W4 to 5W4), as appropriate, according to instructions from the user received via the input interface 13.

The multiresolution restoring function 375 is configured to generate second addition data AD2 by sequentially adding up the plurality of pieces of negative high frequency data to which the plurality of fourth weights (0W4 to 5W4) were respectively applied, while causing the resolutions to match over a range of predetermined resolutions. More specifically, the multiresolution restoring function 375 is configured to enlarge the fifth positive high frequency data PD5 to which the fourth weight 5W4 corresponding to the fifth level was applied, by performing the fifth Gaussian enlargement GSE5. The multiresolution restoring function 375 is configured to add together, on the fourth level, the positive high frequency data enlarged by the fifth Gaussian enlargement GSE5 and the fourth positive high frequency data PD4 to which the fourth weight 4W4 corresponding to the fourth level was applied.

The multiresolution restoring function 375 is configured to enlarge the positive high frequency data resulting from the addition on the fourth level by performing the fourth Gaussian enlargement GSE4 and to add together, on the third level, the enlarged positive high frequency data and the third positive high frequency data PD3 to which the fourth weight 3W4 corresponding to the third level was applied. The multiresolution restoring function 375 is configured to enlarge the positive high frequency data resulting from the addition on the third level by performing the third Gaussian enlargement GSE3 and to add together, on the second level, the enlarged positive high frequency data and the second positive high frequency data PD2 to which the fourth weight 2W4 corresponding to the second level was applied. The multiresolution restoring function 375 is configured to enlarge the positive high frequency data resulting from the addition on the second level by performing the second Gaussian enlargement GSE2 and to add together, on the first level, the enlarged positive high frequency data and the first positive high frequency data PD1 to which the fourth weight 1W4 corresponding to the first level was applied. The multiresolution restoring function 375 is configured to enlarge the positive high frequency data resulting from the addition on the first level by performing the first Gaussian enlargement GSE1 and to add together, on the zeroth level, the enlarged positive high frequency data and the zeroth positive high frequency data PD0 to which the fourth weight 0W4 corresponding to the zeroth level was applied.

As a result, the multiresolution restoring function 375 has generated the second addition data AD2, as illustrated in FIG. 16, on the basis of the plurality of pieces of positive high frequency data (PD0 to PD5) and the plurality of fourth weights (0W4 to 5W4). As illustrated in FIG. 13, the second addition data AD2 in the present application example corresponds to the positive restored data PRD in FIG. 14. Further, because the brightness correction BC and the display of the combined image CI of which the brightness has been corrected in the present application example are the same as those in the second application example, explanations thereof will be omitted.

Further, for example, when the fourth weight 0W4 corresponding to the zeroth level, the fourth weight 1W4 corresponding to the first level, and the fourth weight 2W4 corresponding to the second level are each a zero weight, whereas the fourth weight 3W4 corresponding to the third level, the fourth weight 4W4 corresponding to the fourth level, and the fourth weight 5W4 corresponding to the fifth level are each 1, the present application example is the same as the second application example. In other words, in the present application example, by applying the fourth weights to the pieces of positive high frequency data in accordance with the levels, it is possible to adjust, as appropriate, the pieces of positive high frequency data that contribute to the second addition data AD2.

The ultrasound diagnosis apparatus 1 according to the third application example of the first embodiment described above is configured to apply the fourth weights W4 corresponding to the levels to which the pieces of positive high frequency data belong, to the pieces of positive high frequency data and to further generate the second addition data PRD by adding up the pieces of positive high frequency data to which the fourth weights W4 were applied while causing the resolutions to match over the range of the predetermined resolutions starting with the lowest resolution. In this situation, it is possible to adjust the fourth weights W4, as appropriate, according to instructions from the user received via the input interface 13. Consequently, the ultrasound diagnosis apparatus 1 in the present example is capable of setting each of the fourth weights W4 in accordance with the plurality of levels and thus expanding the width for the adjustment of the contrast of the combined image CI. Accordingly, the ultrasound diagnosis apparatus 1 in the present example is capable of setting even more appropriately the brightness levels of the biological information realized by the contrast improving process, in accordance with settings desired by the user or default settings. Consequently, the ultrasound diagnosis apparatus 1 in the present example is capable of setting even more appropriately the contrast between the biological information and the non-biological information (e.g., a heart chamber) in the combined image CI and is thus able to further enhance visibility related to the biological information in the combined image CI. Further, by appropriately adjusting the fourth weights W4, it is possible to emphasize the biological information in the combined image CI.

Further, the ultrasound diagnosis apparatus 1 in the present example is capable of decreasing the brightness values in the region rendering the biological information, in accordance with the decrease in the brightness values in the region rendering the non-biological information. It is therefore possible to further decrease saturation of brightness values (whiteout) in the region rendering the biological information that may be caused by the brightness correction BC, i.e., it is possible to suppress brightness saturation more appropriately. Consequently, the ultrasound diagnosis apparatus 1 in the present example is capable of further enhancing the visibility related to the biological information in the combined image CI. Because the other advantageous effects are the same as those of the first embodiment, explanations thereof will be omitted.

Fourth Application Example

In a fourth application example, when the ultrasound data is data related to a power Doppler image, a combined image CI is generated by using the data related to the power Doppler image as the ultrasound data. Further, a threshold value related to a blank process is determined on the basis of brightness values of the combined image CI corresponding to the power Doppler image, so as to generate the power Doppler image by performing the blank process while using the determined threshold value. For example, the blank process is, on the other hand, a pre-processing process that is performed before generating the power Doppler image and a dispersion image. The blank process is a process to cause a region in which velocity values are equal to or larger than the threshold value to be a color display region, for the purpose of eliminating noise components. Because it is possible to apply publicly-known techniques to the blank process as appropriate, explanations thereof will be omitted.

The image generating circuitry 29 is configured to determine the threshold value related to the blank process, on the basis of brightness values of the combined image CI generated by performing the contrast improving process. The image generating circuitry 29 is configured to generate the power Doppler image by performing the blank process while using the determined threshold value.

The ultrasound diagnosis apparatus 1 according to the fourth application example of the first embodiment described above is configured, when the ultrasound data is data related to a power Doppler image, to determine the threshold value related to the blank process on the basis of the brightness values of the combined image CI and to generate the power Doppler image by performing the blank process while using the determined threshold value. As a result, the ultrasound diagnosis apparatus 1 in the present example is capable of setting the threshold value for the blank process by using the combined image CI in which artifacts are decreased. It is therefore possible to enhance the precision level of the noise component elimination from the power Doppler image generated by the blank process and the like. Consequently, the ultrasound diagnosis apparatus 1 in the present example is capable of enhancing visibility related to the biological information in the power Doppler image on which the blank process was performed. Because the other advantageous effects are the same as those of the first embodiment, explanations thereof will be omitted.

Second Embodiment

A difference between a second embodiment and the first embodiment lies in that the contrast improving process realized in the first embodiment is performed by a medical image processing apparatus. For example, the medical image processing apparatus is realized by using a server apparatus connected to a modality via a network, for example. Further, various types of functions implemented by the medical image processing apparatus may be realized by various types of servers provided in a hospital such as a Picture Archiving and Communication System (PACS) server.

Figure 17:
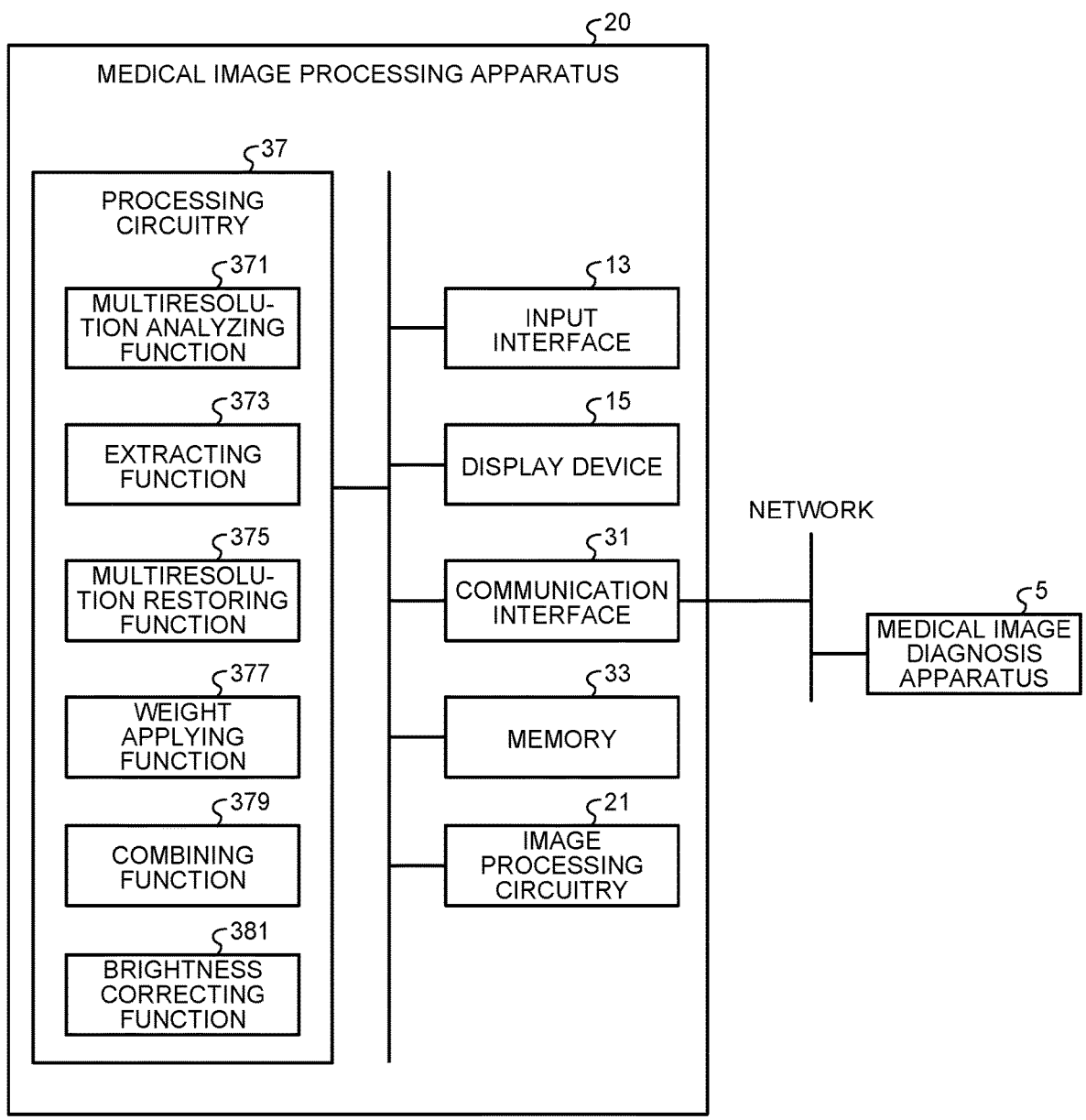
FIG. 17 is a diagram illustrating an exemplary configuration of a medical image processing apparatus according to a second embodiment.

FIG. 17 is a diagram illustrating an exemplary configuration of a medical image processing apparatus 20. The processing circuitry 37 of the medical image processing apparatus 20 includes, for example, the multiresolution analyzing function (a multiresolution analyzing unit) 371, the extracting function (an extracting unit) 373, the multiresolution restoring function (a multiresolution restoring unit) 375, the weight applying function (a weight applying unit) 377, the combining function (a combining unit) 379, and the brightness correcting function (a brightness correcting unit) 381. From a medical image, the multiresolution analyzing function (the multiresolution analyzing unit) 371 is configured to generate a plurality of pieces of low frequency data and a plurality of pieces of high frequency data corresponding to a plurality of resolutions of gradual degrees. From the pieces of high frequency data, the extracting function (the extracting unit) 373 is configured to extract pieces of negative high frequency data over a range of a predetermined resolutions among the plurality of resolutions on the gradual degrees. The multiresolution restoring function (the multiresolution storing unit) 375 is configured to restore the resolution of first addition data so as to be equal to the resolution of the medical image before reduction, the first addition data being obtained by adding up the pieces of negative high frequency data while causing the resolutions to match over the range of the predetermined resolutions. The combining function (the combining unit) 379 is configured to generate a combined image CI on the basis of the restored first addition data and the medical image.

In a contrast improving process performed by the medical image processing apparatus 20, the medical image to be processed does not necessarily have to be ultrasound data. The contrast improving process in the present embodiment is able to use, as appropriate, medical images acquired by any of various types of modalities, for example. In this situation, a medical image diagnosis apparatus 5 corresponds to each of the various types of modalities and is configured to obtain the medical image to be used in the contrast improving process. In that situation, the communication interface 31 is configured to output the medical image obtained by the medical image diagnosis apparatus 5 to the processing circuitry 37.

Further, when the medical image input thereto from the medical image diagnosis apparatus 5 is volume data, an image processing circuitry 21 may generate a two-dimensional image from the volume data, by performing a known three-dimensional image processing process such as a rendering process or a Multi-Planar Reconstruction (MPR) process. Subsequently, the image processing circuitry 21 is configured to output the two-dimensional image to the processing circuitry 37. The processing circuitry 37 is configured to perform the contrast improving process on the two-dimensional image. In an example, the processing circuitry 37 may perform the contrast improving process by using the volume data as a medical image.

Because the procedure and advantageous effects of the contrast improving process according to the second embodiment are the same as those of the first embodiment, explanations thereof will be omitted. Alternatively, the various types of functions implemented in the medical image processing apparatus 20 may be installed in the medical image diagnosis apparatus 5, which may be any of various types of modalities. Further, in a modification example of the second embodiment, the medical image processing apparatus 20 may be realized by using a workstation or cloud computing. In that situation, the input interface 13 and the display 15 may be connected to a network as client apparatuses, for example. Further, the communication interface 31, the memory 33, and the processing circuitry 87 may be installed in a server on a network. Because advantageous effects of the second embodiment are the same as those of the first embodiment, explanations thereof will be omitted.

When the technical concepts of the various embodiments and the various modification examples are realized by using a medical image processing program, the medical image processing program is configured to cause a computer to realize: generating, from a medical image, a plurality of pieces of low frequency data and a plurality of pieces of high frequency data corresponding to a plurality of resolutions of gradual degrees; extracting, from the pieces of high frequency data, pieces of negative high frequency data over a range of a predetermined resolutions among the plurality of resolutions of the gradual degrees; restoring the resolution of first addition data so as to be equal to the resolution of the medical image before reduction, the first addition data being obtained by adding up the pieces of negative high frequency data while causing the resolutions to match over the range of the predetermined resolutions; and generating a combined image CI on the basis of the restored first addition data and the medical image.

For example, it is also possible to realize an index obtaining process by installing the medical image processing program in a PACS server or an integrated server in a hospital information system or in a computer of the ultrasound diagnosis apparatus 1 or the like and loading the program into a memory. In that situation, the program capable of causing the computer to implement the method may also be distributed as being stored in a storage medium such as a magnetic disk (e.g., a hard disk), an optical disk (e.g., a Compact Disk Read-Only Memory [CD-ROM] or a Digital Versatile Disk [DVD]), or a semiconductor memory. Because the processing procedure and advantageous effects of the medical image processing program are the same as those of the first embodiment, explanations thereof will be omitted.

According to at least one aspect of the embodiments, the application examples, and the like described above, it is possible to enhance the visibility of the biological structure in the medical images.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ultrasound diagnosis apparatus comprising processing circuitry and a display, wherein
the processing circuitry is configured:
to generate, from ultrasound data, a plurality of pieces of low resolution data corresponding to a plurality of hierarchical levels, a plurality of resolutions of gradual degrees corresponding to the hierarchical levels;
to extract pieces of negative low resolution data from the plurality of pieces of low resolution data;
to restore a resolution of first addition data so as to be equal to a resolution of the ultrasound data before reduction, the first addition data being obtained by adding up the pieces of negative low resolution data while causing resolutions to match over a range of predetermined resolutions; and
to generate a combined image on a basis of the restored first addition data and the ultrasound data, and
the display is configured to display the combined image.

2. The ultrasound diagnosis apparatus according to claim 1, wherein
the processing circuitry is configured to apply a first weight to the restored first addition data in accordance with contrast of a structure in the ultrasound data, and
the processing circuitry is configured to generate the combined image by combining the first addition data to which the first weight was applied, with the ultrasound data.

3. The ultrasound diagnosis apparatus according to claim 2, wherein
to each of the pieces of negative low resolution data, the processing circuitry is configured to apply a second weight corresponding to the resolution to which the piece of negative low resolution data belongs, and
the processing circuitry is configured to generate the first addition data by adding up the pieces of negative low resolution data to which the second weights were applied, while causing the resolutions to match over the range of the predetermined resolutions.

4. The ultrasound diagnosis apparatus according to claim 3, wherein
the processing circuitry is configured:
to extract, from the pieces of low resolution data, pieces of positive low resolution data over a range of predetermined resolutions among the plurality of resolutions of the gradual degrees;
to restore a resolution of second addition data so as to be equal to the resolution of the ultrasound data before the reduction, the second addition data being obtained by adding up the pieces of positive low resolution data while causing the resolutions to match over the range of the predetermined resolutions;
to apply a third weight to the restored second addition data in accordance with the contrast of the structure; and
to generate the combined image by combining together the first addition data to which the first weight was applied, the second addition data to which the third weight was applied, and the ultrasound data.

5. The ultrasound diagnosis apparatus according to claim 4, wherein
to each of the pieces of positive low resolution data, the processing circuitry is configured to apply a fourth weight corresponding to the resolution to which the piece of positive low resolution data belongs, and
the processing circuitry is configured to generate the second addition data by adding up the pieces of positive low resolution data to which the fourth weights were applied, while causing the resolutions to match over the range of the predetermined resolutions.

6. The ultrasound diagnosis apparatus according to claim 5, further comprising: an input interface configured to receive an input of at least one selected from among the predetermined resolutions, the first weight, the second weights, the third weight, and the fourth weights.

7. The ultrasound diagnosis apparatus according to claim 1, wherein
the processing circuitry is configured to correct brightness of the combined image on a basis of a first average brightness value related to the ultrasound data and a second average brightness value of the combined image, and
the display is configured to display the combined image of which the brightness has been corrected.

8. The ultrasound diagnosis apparatus according to claim 1, wherein
the ultrasound data is at least one of: data related to a B-mode image; raw data related to the B-mode image; and data related to a power Doppler image, wherein
the ultrasound diagnosis apparatus further comprises image generating circuitry configured, when the ultrasound data is the data related to the power Doppler image, to determine a threshold value related to a blank process on a basis of brightness values of the combined image and to generate the power Doppler image by performing the blank process while using the determined threshold value.

9. A medical image processing apparatus comprising processing circuitry configured:
to generate, from a medical image, a plurality of pieces of low frequency data and a plurality of pieces of high frequency data corresponding to a plurality of resolutions of gradual degrees;
to extract, from the plurality of pieces of high frequency data, pieces of negative high frequency data over a range of predetermined resolutions among the plurality of resolutions of the gradual degrees;
to restore a resolution of first addition data so as to be equal to a resolution of the medical image before reduction, the first addition data being obtained by adding up the pieces of negative high frequency data while causing resolutions to match over the range of the predetermined resolutions; and
to generate a combined image on a basis of the restored first addition data and the medical image, wherein
each piece of low frequency data corresponds to a region of the medical image and each piece of low frequency data has a smaller number of pixels than the corresponding region of the medical image, and
each piece of high frequency data is generated from two pieces of low frequency data, the two pieces of low frequency data are equal in size and have different resolutions.

10. A non-transitory computer-readable storage medium storing therein a medical image processing program that causes a computer to realize:
generating, from a medical image, a plurality of pieces of low frequency data and a plurality of pieces of high frequency data corresponding to a plurality of resolutions of gradual degrees;
extracting, from the plurality of pieces of high frequency data, pieces of negative high frequency data over a range of predetermined resolutions among the plurality of resolutions of the gradual degrees;
restoring a resolution of first addition data so as to be equal to a resolution of the medical image before reduction, the first addition data being obtained by adding up the pieces of negative high frequency data while causing resolutions to match over the range of the predetermined resolutions; and
generating a combined image on a basis of the restored first addition data and the medical image, wherein
each piece of low frequency data corresponds to a region of the medical image and each piece of low frequency data has a smaller number of pixels than the corresponding region of the medical image, and
each piece of high frequency data is generated from two pieces of low frequency data, the two pieces of low frequency data are equal in size and have different resolutions.

11. An ultrasound diagnosis apparatus comprising processing circuitry and a display, wherein
the processing circuitry is configured:
to generate, from ultrasound data, a plurality of pieces of low frequency data and a plurality of pieces of high frequency data corresponding to a plurality of resolutions of gradual degrees;
to extract pieces of negative high frequency data over a range of predetermined resolutions, from the plurality of pieces of high frequency data;
to restore a resolution of first addition data so as to be equal to a resolution of the ultrasound data before reduction, the first addition data being obtained by adding up the pieces of negative high frequency data while causing resolutions to match over the range of the predetermined resolutions; and
to generate a combined image on a basis of the restored first addition data and the ultrasound data, and
the display is configured to display the combined image, wherein
each piece of low frequency data corresponds to a region of the ultrasound data and each piece of low frequency data has a smaller number of pixels than the corresponding region of the ultrasound data, and
each piece of high frequency data is generated from two pieces of low frequency data, the two pieces of low frequency data are equal in size and have different resolutions.

* * * * *